US008825468B2

(12) United States Patent
Jacobsen et al.

(10) Patent No.: US 8,825,468 B2
(45) Date of Patent: Sep. 2, 2014

(54) MOBILE WIRELESS DISPLAY PROVIDING SPEECH TO SPEECH TRANSLATION AND AVATAR SIMULATING HUMAN ATTRIBUTES

(75) Inventors: Jeffrey J. Jacobsen, Hollister, CA (US); Stephen A. Pombo, Campbell, CA (US)

(73) Assignee: Kopin Corporation, Taunton, MA (US)

( * ) Notice: Subject to any disclaimer, the term of this patent is extended or adjusted under 35 U.S.C. 154(b) by 578 days.

(21) Appl. No.: 12/221,199

(22) Filed: Jul. 31, 2008

(65) Prior Publication Data

US 2009/0099836 A1    Apr. 16, 2009

Related U.S. Application Data

(63) Continuation-in-part of application No. 12/152,462, filed on May 14, 2008.

(60) Provisional application No. 60/962,686, filed on Jul. 31, 2007, provisional application No. 60/966,704, filed on Aug. 29, 2007, provisional application No. 60/994,989, filed on Sep. 24, 2007.

(51) Int. Cl.
*G06F 17/28* (2006.01)
*G06F 17/00* (2006.01)

(52) U.S. Cl.
CPC ..................... *G06F 17/289* (2013.01)
USPC ................. 704/3; 704/275; 704/2; 351/158

(58) Field of Classification Search
CPC ................... G02C 11/10; G02C 1/00
USPC ................... 704/3, 275, 2; 351/158
See application file for complete search history.

(56) References Cited

U.S. PATENT DOCUMENTS

| 5,235,979 A | 8/1993 | Adams |
| 5,806,526 A | 9/1998 | Rhoad |

(Continued)

FOREIGN PATENT DOCUMENTS

| JP | 09-504120 A | 4/1997 |
| JP | 10-301055 A | 11/1998 |

(Continued)

OTHER PUBLICATIONS

Huang, X., et al., "Multimodal Interaction Prototype," *IEEE International Conference on Acoustics, Speech, and Signal Processing Proceedings*, vol. 1, pp. 9-12 (2001, month of publication not available).

(Continued)

*Primary Examiner* — Vincent P Harper
(74) *Attorney, Agent, or Firm* — Hamilton, Brook, Smith & Reynolds, P.C.

(57) ABSTRACT

An apparatus includes a monocular display with a wireless communications interface, user input device, transmitter, and controller, and may provide a video link to and control and management of a host device and other devices, such as a cell phone, computer, laptop, or media player. The apparatus may receive speech and digitize it. The apparatus may compare the digitized speech in a first language to a table of digitized speech in a second language to provide translation or, alternatively, may compare the digitized speech to a table of control commands. The control commands allow user interaction with the apparatus or other remote devices in a visual and audio manner. The control signals control a "recognized persona" or avatar stored in a memory to provide simulated human attributes to the apparatus, network or third party communication device. The avatar may be changed or upgraded according to user choice.

36 Claims, 24 Drawing Sheets

(56) References Cited

U.S. PATENT DOCUMENTS

| | | |
|---|---|---|
| 5,815,126 A | 9/1998 | Fan et al. |
| 5,990,793 A | 11/1999 | Bieback |
| 6,010,216 A | 1/2000 | Jesiek |
| 6,108,197 A | 8/2000 | Janik |
| 6,204,974 B1 | 3/2001 | Spitzer |
| 6,325,507 B1 | 12/2001 | Jannard et al. |
| 6,535,854 B2* | 3/2003 | Buchner et al. ............... 704/275 |
| 6,798,391 B2 | 9/2004 | Peterson, III |
| 6,853,293 B2 | 2/2005 | Swartz et al. |
| 6,900,777 B1 | 5/2005 | Hebert et al. |
| 6,922,184 B2 | 7/2005 | Lawrence et al. |
| 6,956,614 B1 | 10/2005 | Quintana et al. |
| 6,966,647 B2 | 11/2005 | Jannard et al. |
| 7,004,582 B2 | 2/2006 | Jannard et al. |
| 7,013,009 B2 | 3/2006 | Warren |
| 7,082,393 B2 | 7/2006 | Lahr |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,219,994 B2 | 5/2007 | Jannard et al. |
| 7,231,038 B2 | 6/2007 | Warren |
| 7,249,846 B2 | 7/2007 | Garnd et al. |
| 7,278,734 B2 | 10/2007 | Jannard et al. |
| 7,302,465 B2* | 11/2007 | Ayres et al. ................... 709/203 |
| 7,331,666 B2 | 2/2008 | Swab et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,512,414 B2* | 3/2009 | Jannard et al. ............. 455/556.1 |
| 7,542,012 B2 | 6/2009 | Kato et al. |
| 7,620,432 B2 | 11/2009 | Willins et al. |
| 7,648,236 B1* | 1/2010 | Dobson ......................... 351/158 |
| 7,682,018 B2 | 3/2010 | Jannard |
| 7,711,103 B2* | 5/2010 | Culbertson et al. ...... 379/221.15 |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,918,556 B2 | 4/2011 | Lewis |
| 7,959,084 B2 | 6/2011 | Wulff |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,976,480 B2 | 7/2011 | Grajales et al. |
| 7,988,283 B2 | 8/2011 | Jannard |
| 7,997,723 B2 | 8/2011 | Pienimaa et al. |
| 8,010,156 B2 | 8/2011 | Warran |
| 8,020,989 B2 | 9/2011 | Jannard et al. |
| 8,025,398 B2 | 9/2011 | Jannard |
| 8,072,393 B2 | 12/2011 | Ricchel |
| 8,092,011 B2 | 1/2012 | Sugihara et al. |
| 8,098,439 B2 | 1/2012 | Amitai et al. |
| 8,123,352 B2 | 2/2012 | Matsumoto et al. |
| 8,140,197 B2 | 3/2012 | Lapidot et al. |
| 8,212,859 B2 | 7/2012 | Tang et al. |
| 2002/0015008 A1 | 2/2002 | Kishida et al. |
| 2002/0094845 A1 | 7/2002 | Inasaka |
| 2003/0028380 A1* | 2/2003 | Freeland et al. ............... 704/260 |
| 2003/0068057 A1 | 4/2003 | Miller et al. |
| 2004/0113867 A1 | 6/2004 | Tomine et al. |
| 2004/0156114 A1* | 8/2004 | Sayed et al. ................... 359/630 |
| 2005/0136958 A1* | 6/2005 | Seshadri et al. ............... 455/519 |
| 2005/0192811 A1* | 9/2005 | Parks et al. ................... 704/277 |
| 2005/0219152 A1* | 10/2005 | Budd et al. ....................... 345/8 |
| 2005/0264527 A1 | 12/2005 | Lin |
| 2006/0095265 A1 | 5/2006 | Chu et al. |
| 2006/0122840 A1 | 6/2006 | Anderson et al. |
| 2006/0132382 A1 | 6/2006 | Jannard |
| 2006/0293874 A1 | 12/2006 | Zhang et al. |
| 2007/0218987 A1* | 9/2007 | Van Luchene et al. ......... 463/30 |
| 2008/0198324 A1 | 8/2008 | Fuziak |
| 2009/0128448 A1 | 5/2009 | Riechel |
| 2009/0154719 A1 | 6/2009 | Wulff et al. |
| 2009/0180195 A1 | 7/2009 | Cakmakci et al. |
| 2010/0020229 A1 | 1/2010 | Hershey et al. |
| 2010/0033830 A1 | 2/2010 | Yung |
| 2010/0053069 A1 | 3/2010 | Tricoukes et al. |
| 2010/0121480 A1 | 5/2010 | Stelzer et al. |
| 2010/0171680 A1 | 7/2010 | Lapidot et al. |
| 2010/0238184 A1 | 9/2010 | Janicki |
| 2010/0271587 A1 | 10/2010 | Pavlopoulos |
| 2010/0277563 A1 | 11/2010 | Gupta et al. |
| 2010/0289817 A1 | 11/2010 | Meier et al. |
| 2011/0001699 A1 | 1/2011 | Jacobsen et al. |
| 2011/0089207 A1 | 4/2011 | Tricoukes et al. |
| 2011/0090135 A1 | 4/2011 | Tricoukes et al. |
| 2011/0214082 A1 | 9/2011 | Osterhout et al. |
| 2011/0221669 A1 | 9/2011 | Shams et al. |
| 2011/0221671 A1 | 9/2011 | King, III et al. |
| 2011/0227812 A1 | 9/2011 | Haddick et al. |
| 2011/0227813 A1 | 9/2011 | Haddick et al. |
| 2011/0254698 A1 | 10/2011 | Eberl et al. |
| 2011/0255050 A1 | 10/2011 | Jannard et al. |
| 2011/0273662 A1 | 11/2011 | Hwang et al. |
| 2012/0013843 A1 | 1/2012 | Jannard |
| 2012/0026071 A1 | 2/2012 | Hamdani et al. |
| 2012/0056846 A1 | 3/2012 | Zaliva |
| 2012/0062445 A1 | 3/2012 | Haddick et al. |
| 2012/0105740 A1 | 5/2012 | Jannard et al. |
| 2012/0114131 A1 | 5/2012 | Tricoukes et al. |
| 2012/0188245 A1 | 7/2012 | Hyatt |

FOREIGN PATENT DOCUMENTS

| | | |
|---|---|---|
| JP | 2005-286927 A | 10/2005 |
| JP | 2006-005804 A | 1/2006 |
| JP | 2006-197734 A | 7/2006 |
| WO | WO 95/21408 | 8/1995 |
| WO | WO 95/23994 | 9/1995 |
| WO | WO 00/79327 | 12/2000 |
| WO | WO 2009/076016 | 6/2009 |
| WO | WO 2011/051660 | 5/2011 |
| WO | WO 2012/040386 | 3/2012 |

OTHER PUBLICATIONS

Zhou, Bowen, et al., "A Hand-Held Speech-to-Speech Translation System," *IEEE Workshop on St. Thomas, VI*, pp. 664-669 (2003, month of publication not available).

Partial International Search Report for PCT/US2008/009267, mailed Nov. 17, 2008, 3 pages.

Notification Concerning Transmittal of International Preliminary Report on Patentability for International Application No. PCT/US2008/009267 dated Feb. 11, 2010.

Waibel, A., et al., "Speechalator: Two-Way Speech-To-Speech Translation in your Hand," *Proceedings of HLT-NAACL-Demonstrations*, pp. 29-30 (2003).

Wahlster, W., "Mobile Speech-to-Speech Translation of Spontaneous Dialogs: An Overview of the Final Verbmobil System," downloaded from htt;://verbmobil.dfki.de/ww.html on Jul. 24, 2008, pp. 1-18.

"Speech-to-Speech Translation," downloaded from http://domino.watson.ibm.com/comm/resarch.nsf/pages/r.uit.innovation.html on Jul. 24, 2008, pp. 1-4.

Extended European Search Report, Nov. 8, 2010, Application No. EP10075102.3.

* cited by examiner

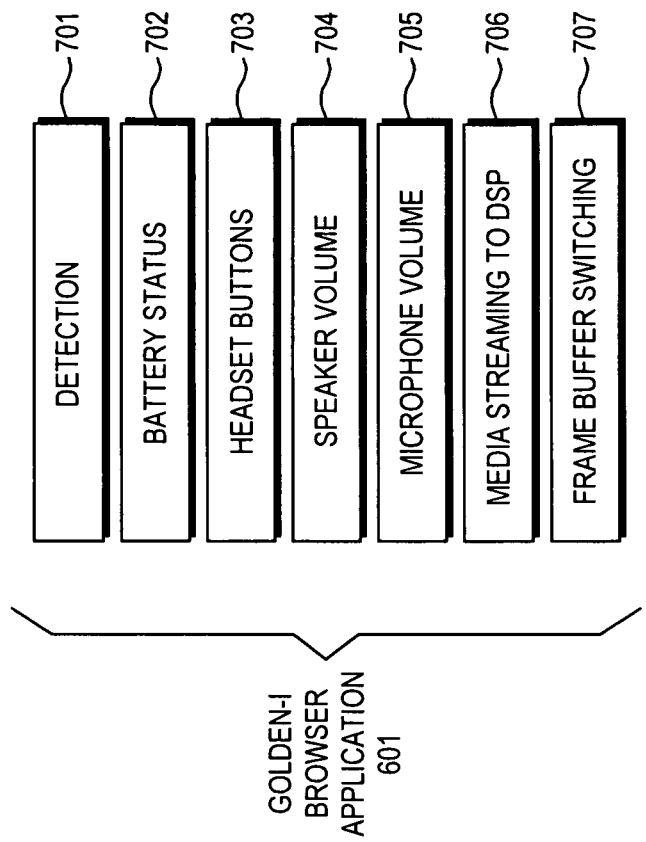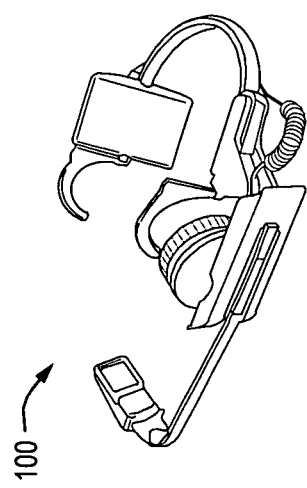
FIG. 7

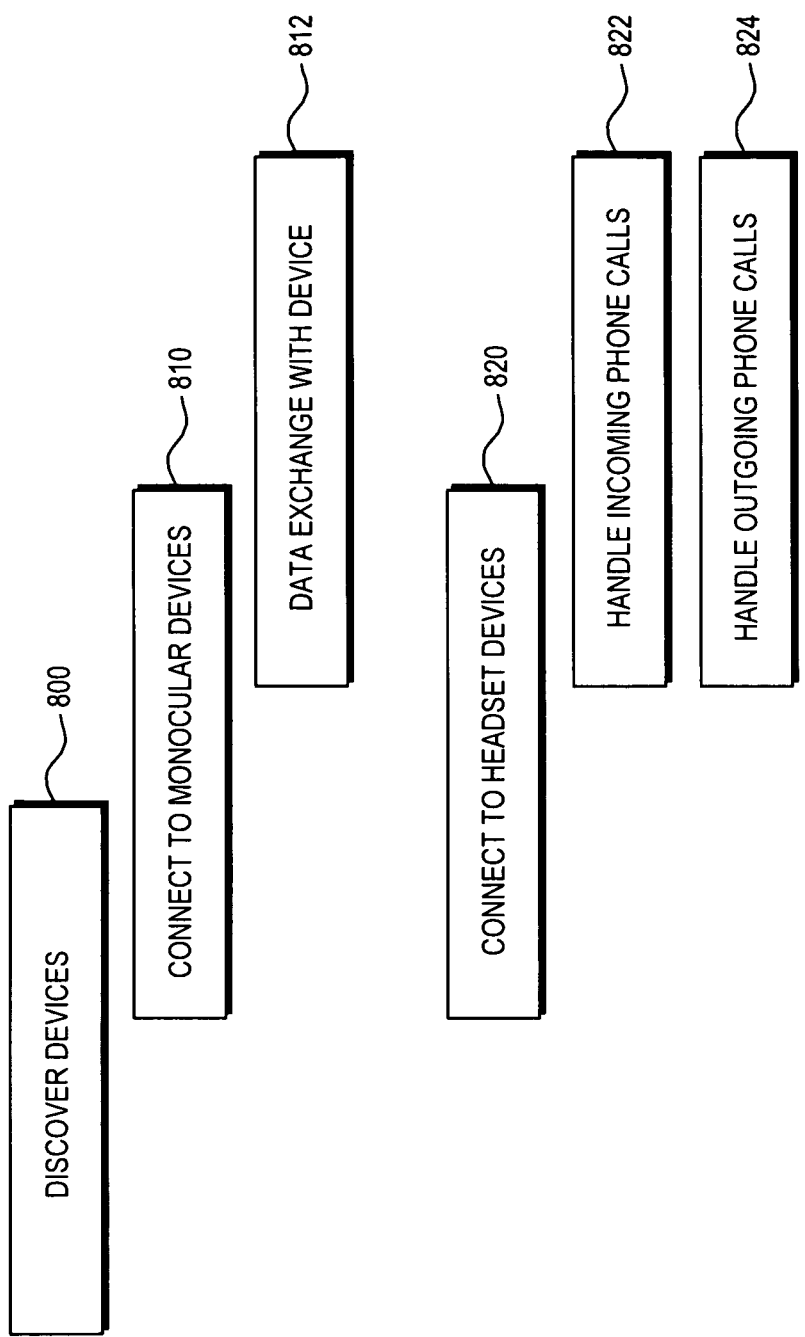

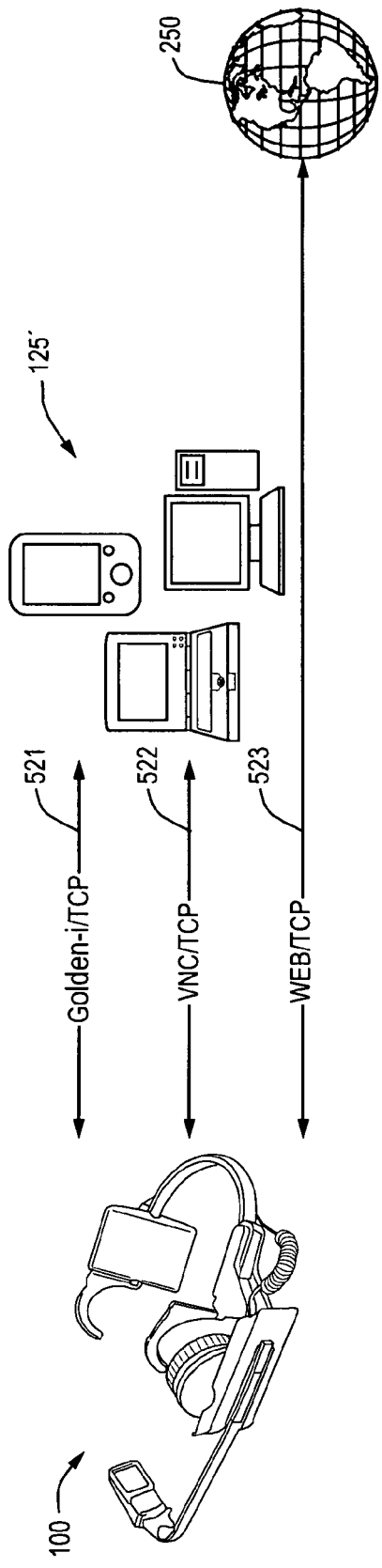
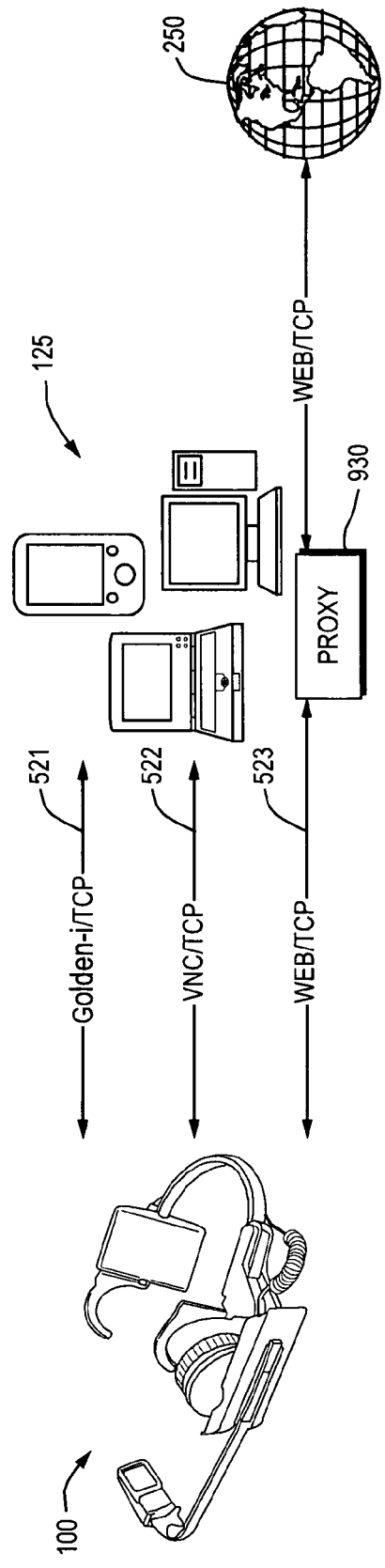
FIG. 9A
FIG. 9B

MOBILE WIRELESS DISPLAY PROVIDING SPEECH TO SPEECH TRANSLATION AND AVATAR SIMULATING HUMAN ATTRIBUTES

RELATED APPLICATIONS

This application is a continuation-in-part of U.S. patent application Ser. No. 12/152,462, filed May 14, 2008, and claims the benefit of U.S. Provisional Application No. 60/962,686, filed on Jul. 31, 2007, U.S. Provisional Application No. 60/966,704, filed Aug. 29, 2007 and U.S. Provisional Application No. 60/994,989, filed Sep. 24, 2007. This application also relates to U.S. patent application Ser. No. 12/008,114, filed Jan. 8, 2008 and U.S. patent application Ser. No. 12/008,104, filed Jan. 8, 2008. The entire teachings of the above applications are incorporated herein by reference.

BACKGROUND OF THE INVENTION

Mobile communications devices are also known in the art. Recent technology convergence between mobile cellular telephones and digital media players, such as with the iPhone™ are increasingly placing small, portable devices capable of storing large amounts of video and other content in the hands of consumers. While these handheld devices typically include a video screen, the visual experience for high resolution, a large format display could never be replicated in such a device, simply because of the physical size limitations expected of a handheld unit. Further, there has been an explosion of remote personal computing done in day to day activities. Users will browse the Internet using a remote computing device, such as a Personal Digital Assistant, a Smart Phone, or BLACKBERRY® communication device and will conduct business in a remote manner, will listen to music and engage in other activities, (taking pictures, sending and retrieving e-mail, sending and retrieving instant messages, etc.).

Typically, many users spend great amounts of time in personalizing their mobile communication devices. The users of the mobile communication devices, such as, for example, mobile phones will affix jewelry to the device, purchase the device in a certain color, and will download specific software programs to the communication device memory to provide a specific ring tone when receiving a call that is specific to a favorite caller, such as an aunt or uncle. Often because of this personalization, the users will grow an affectionate bond to the handheld device, and will enjoy using the device more because of the specific personalization.

Further, head-worn display devices are known in the art. Such displays include visual and audio devices. These devices provide the wearer of the display with sound and graphics. Typically, the display is a small color monitor arranged to present images to a user's left eye, right eye, or both. These devices often surround the user's face or head and thus not only are heavy but also occlude substantially all of the user's vision. In other words, while wearing the display, the user generally cannot easily view other objects in the user's normal peripheral vision or loses substantial portions of normal peripheral vision during use. Other head worn displays may include two separate displays, one for each eye, that are also supported on a heavy frame.

As a result, consumers are now seeking high-quality, portable, color displays to augment their handheld video devices. One such display is worn on the user's face or head similar to a pair of eyeglasses or headphones. Through recent dramatic developments in optical technologies, these devices can provide the appearance of a large format, high resolution display. One example of such a device is found in U.S. Pat. No. 7,088,234 issued to Naito, et al. and assigned to Matsushita Electrical Industries. The wearable information device described in that patent can display certain information to notify the user, e.g., information about arrival of an e-mail, etc. Another such device is described in U.S. Pat. No. 7,158,096 issued to Spitzer and assigned to MyVu Corporation. That device includes a projection type display attached to one end of a head-mountable support. An eyepiece assembly is attached to a second end of the support. The support maintains the projection system and the eyepiece assembly in alignment along an optical path.

While, these devices can provide a high-resolution display of images and sound, occlusion of the user's normal viewing space, or a majority thereof can be problematic. The user will typically only use the display in a few, select locations where that user perceives the location to be safe, for example, in a living room, elsewhere in the home, in a work space while seated or standing or in a substantially fixed location. Users cannot efficiently perform many other day to day tasks when wearing an occlusive display device. These tasks include participating in activities requiring moderate to high personal mobility, requiring frequent depth perception adjustments, moving through areas with irregular and uneven surfaces or requiring active collision avoidance (i.e., personally moving through areas or events with constantly changing obstacles, crowds, avoiding fast moving objects that may be encountered, while operating vehicles, negotiating the use of public transportation) or any circumstance where personal safety maybe sacrificed by loss of normal peripheral vision.

Secondly, such prior art head worn displays are limiting in certain limited tasks. Such tasks can include viewing images, graphics or movies with audio. This can be for gaming purposes or recreational viewing of images from a television broadcast or video. Such prior art head worn displays are severely limited in connection with other day-to-day desired functional computing tasks. For example, the user may desire using the display in connection with communication tasks, running business applications, active navigation tasks, mobile instruction with real time updates or using the display to wirelessly control other devices that the user regularly uses or comes in contact with on a day to day basis. These devices can include such as, for example, a Personal Digital Assistant, a notebook computer, a desktop computer, a mobile phone, a vehicle, a wireless network, wireless service hot spot, thin client, other electronic device or an appliance. Such prior art head worn displays often cannot interface with or slave such devices to initiate and control running programs, initiate real time device functional changes, alter real time device operational parameters, enable local or remote wireless communication with mobile devices and/or engage with wireless networks and services.

Thirdly, such prior art devices are not readily upgradeable to provide other functions that the user may desire. A user may desire, in some locations, to have some functional attributes of one or more particular software applications or one or more particular hardware configurations, while in other locations the user may not desire to have those software applications or hardware configurations. In fact, the user may not use such a heavy display device with multiple software applications or hardware configurations, and instead may wish to remove unnecessary software and hardware from the device so the device remains ultra lightweight.

Moreover, users would enjoy more compact mobile devices that can access important data that are lightweight, and do not require users to carry relatively larger, and bulkier computers, such as notebook computers, laptops, tablet computing devices, or relatively larger media players. Additionally, users, when they do carry their laptops, often have to flip the laptop open, then boot the machine, which takes time. This is disfavored, especially, when the user wants a specific information quickly, such as, an address, e-mail, or relevant text from an e-mail attachment, while traveling.

Microsoft Windows SideShow® is a software program that is in an operating system (OS) that supports a secondary screen on a mobile personal computer, such as a laptop computer, that is generally disposed on the rear of the laptop cover. With this additional secondary display, a user can access the Microsoft Windows SideShow® software program to display images on the secondary display while the computer is in sleep mode or turned on or off. Microsoft Windows SideShow® uses convenient mini programs called Gadgets. These Gadget programs extend information from the laptop to other devices. Gadgets can run on computers operating with Microsoft Windows SideShow® compatible device and update that device with information from the computer. Gadgets may allow viewing of information from the computer regardless of whether it is on, off, or in sleep mode. This saves power and a user's time by not requiring booting of the computer. These gadget software programs are limiting and users desire a software gadget that permits wireless access to the laptop computer without the need to use any input device to continuously monitor. Additionally, users desire great amounts of information from the computer while the laptop computer, or PC, is on, off, or in sleep mode.

SUMMARY OF THE INVENTION

Often users must have to take relatively large computing devices with them in order to conduct these tasks. Users would desire to have a wireless, audio, visual head mounted communication device that is unobtrusive, and is hands free, and that can wireless interact with other computing devices in a lightweight, wireless format that is free from a connection to a heavy computing device. Moreover, users would desire to abandon keyboards, input devices or touch screens, and would prefer using speech recognition to accomplish these input and output computer tasks. Additionally, users would also desire to have the ability to interact with the device in a favorable manner, or interact with the device in a highly personalized manner. Users would desire a highly personalized software application that is preloaded on the device, or can be purchased in a wireless manner. There is also a need in the art for a device that provides for other functions besides viewing images or graphics and that can be user upgradeable so the user can select and choose which hardware or software components the user desires to interface with the device.

Further, there is a need in the art for lightweight device that can interrogate other computing devices to form a wireless link and that can receive and exchange data between a monocular display device and a computing device. There is also a need in the art for a monocular display device that can act as a redundant auxiliary monocular display screen for a computing device so the user can access data from the computing device from the redundant auxiliary display screen using an input device in a master-slave networking relationship.

According to a first example embodiment of the present invention, a monocular display device may include a wireless interface configured to wirelessly communicate with a host computing system. The host computing system has a primary display that receives a control signal from the host computing system to display images. The control signal is communicated to a second host wireless interface. The control signal is transmitted from the second wireless host interface to the wireless interface. The signal is then transmitted to the monocular display to display images on the monocular display. The monocular display is located remote from the host computing system. The apparatus has a controller connected to a memory with the controller, and the memory connected to a bus. A display, a microphone, and a speaker are operatively connected to the bus. The controller has program instructions for receiving speech commands from the microphone, and for converting the speech commands into digital data packets.

In an embodiment, the microphone receives an audio signal of speech of a first language spoken by an individual in proximity to the wearer or source. The microphone is connected to a converter that converts the audio signal to a digital representation of the audio signal. The controller compares the digital representation of the audio signal to a language table stored in memory to convert the digital representation to a second digital representation. This second digital representation of the audio signal is a translation of the first language into a second language. The controller converts the second digital representation of the audio signal to a voice modulated audio signal of the second language. The controller controls a speaker which outputs the voice modulated audio signal of the second language to the wearer so the wearer can understand the speech of the first language and hear the translation in a voice modulated manner.

In another embodiment, the voice modulated audio signal may be output to the wearer in an aesthetically pleasing manner and is associated with a prerecorded voice stored in memory. The controller can additionally convert the audio signal to displayed text in addition to the speech. The text can be displayed on the screen of the display at the same time as the voice modulated audio signal and in the second language. The voice modulated audio signal can be associated with a celebrity's recorded voice, and the voice modulated audio signal of the second language can be a translation of the foreign speech that occurs in real time.

The controller also has program instructions for receiving the data packets and comparing the data packets to a lookup table stored in memory to convert the data packets into a control command. The controller outputs the control command to components to permit interaction with components of the apparatus and for user control of the peripheral components of the apparatus. The controller has program instructions for interacting in a visual and audio manner with the wearer in response to the control command. The controller outputs interactive control signals in a software format that is associated with a "recognized persona" stored in the memory. The software outputs control commands to the display to display a "persona" in the form of a simulated human like video appearance that is associated with a celebrity or other "recognized persona." A solely "audio persona" that includes program instructions to recite a menu option of speech commands in a specific recorded voice is also envisioned. The recognized persona provides simulated human attributes for interaction, and control of the apparatus and permits the user to interact with the simulated video or audio "persona" to control the device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7 is a diagram illustrating an example hardware interface of an example embodiment monocular display device.

FIGS. 8-10 are block diagrams illustrating a Bluetooth proxy for carrying data packets over a bidirectional communication path.

DETAILED DESCRIPTION OF THE INVENTION

A description of example embodiments of the invention follows.

Figure 1:
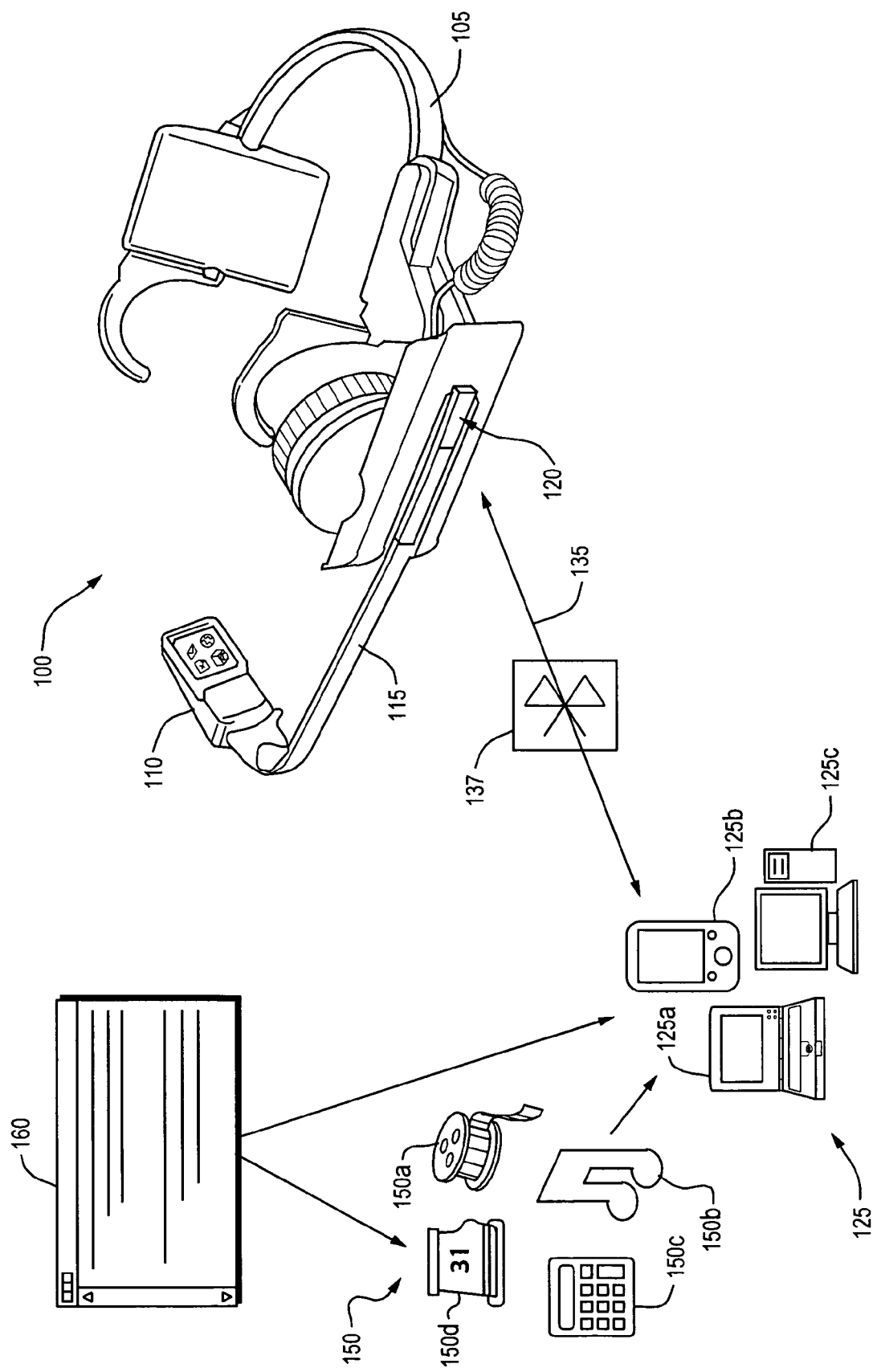
FIG. 1 is a diagram illustrating a perspective view of an example embodiment monocular display device according to the present invention, and wireless communications between the example embodiment monocular display device and host computing devices.

FIG. 1 illustrates an example embodiment monocular display device 100 according to the present invention that plays back multimedia content, and that can run business applications in a wireless manner from a remote computing device in a master-slave networked relationship. The present monocular display device 100 is a lightweight mobile device that includes a body portion 105 that is connected to a display element 110 by a telescoping arm 115, the body portion 105 housing one or more internal components of the device 100, including components of a hardware interface 120 and Bluetooth™ wireless hardware (not shows).

In one embodiment, the display element 110 is a Wide Video Graphics Array (WVGA) display sold under the trade name "CYBERDISPLAY® WVGA LV" manufactured by the instant Assignee. The display element 110 can be a color filter, wide format, active matrix liquid crystal display having a resolution of 854×480. The display element 110, in this embodiment, can be 0.58 inches in the diagonal dimension. In another embodiment, the display element 110 may alternatively include a Super Video Graphics Array (SVGA) display sold under the trade name "CYBERDISPLAY® SVGA LVS", which is also manufactured by the instant Assignee. The display element 110 can be a color filter, active matrix liquid crystal display having a resolution of 800×600. The display element 110 in this embodiment can be about 0.44 inches in the diagonal dimension and lightweight. Other display elements 110 are contemplated, such as those described in detail in U.S. patent application Ser. No. 12/008,114, filed Jan. 8, 2008, and U.S. patent application Ser. No. 12/007,104, filed Jan. 8, 2008, which are incorporated herein by reference in their entirety. The present device 100 is not limited by any specific display element 110, and can be used with any lightweight display known in the art configured for mobile operation.

Preferably, the telescoping arm 115 is a resilient bar-like member made from two cylindrically shaped, telescoping sections connected to a pivot, which are adjustable, and a user may extend and pivot the display element 110 to a comfortable viewing position relative to the body portion 105 so the display element 110 is not directly in front of the user, or blocking the user's vision, but instead is located in the user's peripheral vision. Preferably, the body portion 105 is a resilient member and may include a hook, or similar connector and be connected to a wearer's eyeglasses, or supported on the wearer. The display element 115 preferably is configured to remain outside the viewer's normal vision, and does not block the viewer's eyes, and instead is located outside the viewer's peripheral vision. In this aspect, the user may wear the monocular display device 100 in the user's day-to-day activities, such as, for example, during running, walking, or engaging in recreational activities in a comfortable manner. In one embodiment, the body portion 105 may include a separate clip, or separate connector to fasten to a user's eyeglasses, garment, hat, cap, or another support surface to correctly support the display element 115 located outside the viewer's peripheral vision.

The example embodiment monocular display device 100, preferably, can establish a two-way, or bidirectional wireless communication link 135 with a computing device 125 and thereafter the device 100 can send and receive data from and to the host device 125 across the wireless link 135 with a high data transfer rate. Thereafter, the monocular device 100 can convert the received data across the wireless link to multimedia including graphical video data to display images on the monocular display element 110, which may originate from the host computing device 125 or alternatively from another remove database or source, such as a remote memory.

In one embodiment, the wireless communication link 135 uses short range or long range radiofrequency signals over a designated channel to communicate data between devices in a protocol that is known by both devices 125, 100. Preferably, the radiofrequency signals are low power and in a range of about 1.0 mWatt to 100 mWatts. so as to transmit the radiofrequency signals across a desired distance, which can be from several feet or greater than twenty feet in length.

In one embodiment, the monocular display device 100 uses a Bluetooth® 137 communication standard to communicate with the host computing device 125. In one embodiment, the Bluetooth® technology permits data communication at a data transfer rate of around 1 Mbps with another computing device about 10 meters away using a 2.4 Gigahertz frequency.

In another embodiment, the wireless communication link 135 may use Institute of Electrical and Electronics Engineers (IEEE) 802.11(b), or IEEE 802.11(g), or another standard. In yet another embodiment, the wireless communication link 135 may include Bluetooth® 3.0 with a data transfer rate of about 480 Mbps, Ultra-Wide Band (UWB), Wireless Universal Serial Bus (WUSB), Wireless High Definition (WirelessHD), Wireless High Definition Multimedia Interface (WHDMI), WiFi, or any other high speed digital communication standard known in the art. In a further alternative embodiment, the monocular display device 100 may communicate with the host computing system 125 using a wired connection, instead of link 135 such as, for example, a serial port, or a Universal Serial Bus (USB) cable, or other wired connections. Alternatively, the wireless communication link 135 may include a Code Division Multiple Access (CDMA) standard, a Time Division Multiple Access (TDMA) standard, or Frequency Division Multiple Access (FDMA) standard or, alternatively, any other frequency hopping standard in spread spectrum communication known in the art to communicate data. Various protocol standards for wired and wireless communication are known in the art, and the present device 100 is not limited to any specific link, or radio frequency protocol.

The present monocular display device 100 uses the two-way, or bidirectional wireless communication link 135 with the computing device 125 to playback video and audio on the monocular display element 115. The monocular display device 100 also controls the host computing device 125, such as, for example, a wireless laptop 125a, to run business applications, retrieve e-mail, and run executable code, and applications from the laptop 125a across the wireless link 135. In this regard, the monocular display device 100 may include an input device 120 (e.g., input device 335 of FIG. 3) that can transmit a wireless input signal to the host computing device 125. The input signal can control the host computing device 125 to provide control signals to run applications on the host computing device 125. Thereafter, the host computing device 125 outputs a graphical output to the display element 110 for a remote display of applications operating at the host computing device 125 at the monocular display 100, which may be located a distance away from the host computing device 125. Hosts 125 source content 150 of various types for viewing on the display 110, including video 150a, audio 150b, computer data 150c, and other types of information, such as calendar 150d, email and any number of types of data that would regularly be found from hosts 125.

Further, a software System Development Kit (SDK) 160 may be used by an application programmer to specify interfaces for hosts 125, thereby permitting content 150 to be displayed on display 110. For a number of reasons, the device 100 may not be able to simply display existing web and other types of content. In particular, the content 150 needs to be specially designed and implemented to fit the display 110. To encourage this, the developer SDK 160 enables developers to quickly and easily develop the graphical portion of their applications. The backend of these same applications is then coded into a programmers language of choice for the particular device 100, as will be described in more detail below.

Using the two directional wireless communication link 135, the mobile device 100 can access Microsoft Windows SideShow® to provide data across the link 135 for access to the mobile device 100. Preferably, the Microsoft Windows SideShow® program may be accessed by the mobile device by a wireless Bluetooth, 802.11(b), 802.11 (c), or 802.11 (g) connection, and the mobile device 100 can be located far in distance from the host computing device 125. Preferably, the mobile device 100 can be wirelessly connected to the host computing device 125 via the Internet. Therefore the mobile device 100 is able to connect from anywhere in the world and may access data from a memory operatively connected to the remote host computing device 125.

Further, a PC user can use Microsoft Windows SideShow® to remotely drive, access and command the contents, applications and PC services of a PC or server without having to touch the hibernating or woken PC through Remote Desktop Protocol (RDP), Virtual Network Computing (VNC), GoTo-MyPC (a commercial remote access PC command and control service), etc.

It should be appreciated that the monocular display device 100 is not limited to using any specific host computing device 125, and it should be appreciated that the discussion with regard to the laptop computer 125 is merely illustrative, and is not limiting. The present monocular display device 100 may instead communicate with other mobile portable device or informational databases, such as, for example, a cell phone, Personal Digital Assistant (PDA), such as a PALM® compatible device, desktop computer, tablet computer, mobile e-mail communication device, such as, for example, a Blackberry® device or a Good Technology® compatible device, or personal digital music or video player, such as, for example, an Apple I-Pod® video and audio player, Microsoft Zune® multimedia players, and other Motion Picture Experts Group (MPEG)-1 Audio Layer 3 (MP3) music players, digital video players, or drives. The host computing devices 125 also can include automotive systems, Global Position System devices, Satellite Radio receivers or players, such as, for example, XM Satellite Radio®, or Sirius Satellite Radio® compatible devices. The host computing devices 125 can also include mainframe computing devices, digital testing devices, diagnostic equipment, a TIVO® or other digital video recorder, a set top cable box, or any other digital or analog device known in the art.

It should be appreciated that the monocular display device 100 should have suitable program instructions to convert from a first format to a second format that the desired host computing device 125 can receive and operate with to correctly send control signals, and in this regard, the monocular display device 100 preferably includes a converter (not shown) that converts between formats depending on the specific host computing device. Various format configurations are possible and within the scope of the present disclosure, and the present auxiliary monocular display 100 is not limited to any specific host, or communication format.

The host computing system 125 may communicate with remote databases, and may act as an intermediary between the monocular display device 100 and a source of multimedia content, or site, so the user can view multimedia (in the peripheral vision of the wearer) without the associated heavy computing device and network connections associated with obtaining the multimedia content. It is envisioned that the device 100 is very lightweight, in the order of a few ounces, and supported by the wearer so the wearer can move in an obstructed manner to engage in normal day-to-day activities.

The host computing device 125 may be a personal computing device, such as, for example, a desktop or laptop computer that includes an operating system (OS), such as, for example, the Microsoft Windows Vista® OS, Microsoft Windows Mobile®, Apple Mac OSX® OS, Symbian OS compatible operating systems, Lenovo compatible operating systems, the Linux operating system, the UNIX operating system or another known suitable operating system that is Internet ready, and configured for wireless mobile operation.

Figure 2:
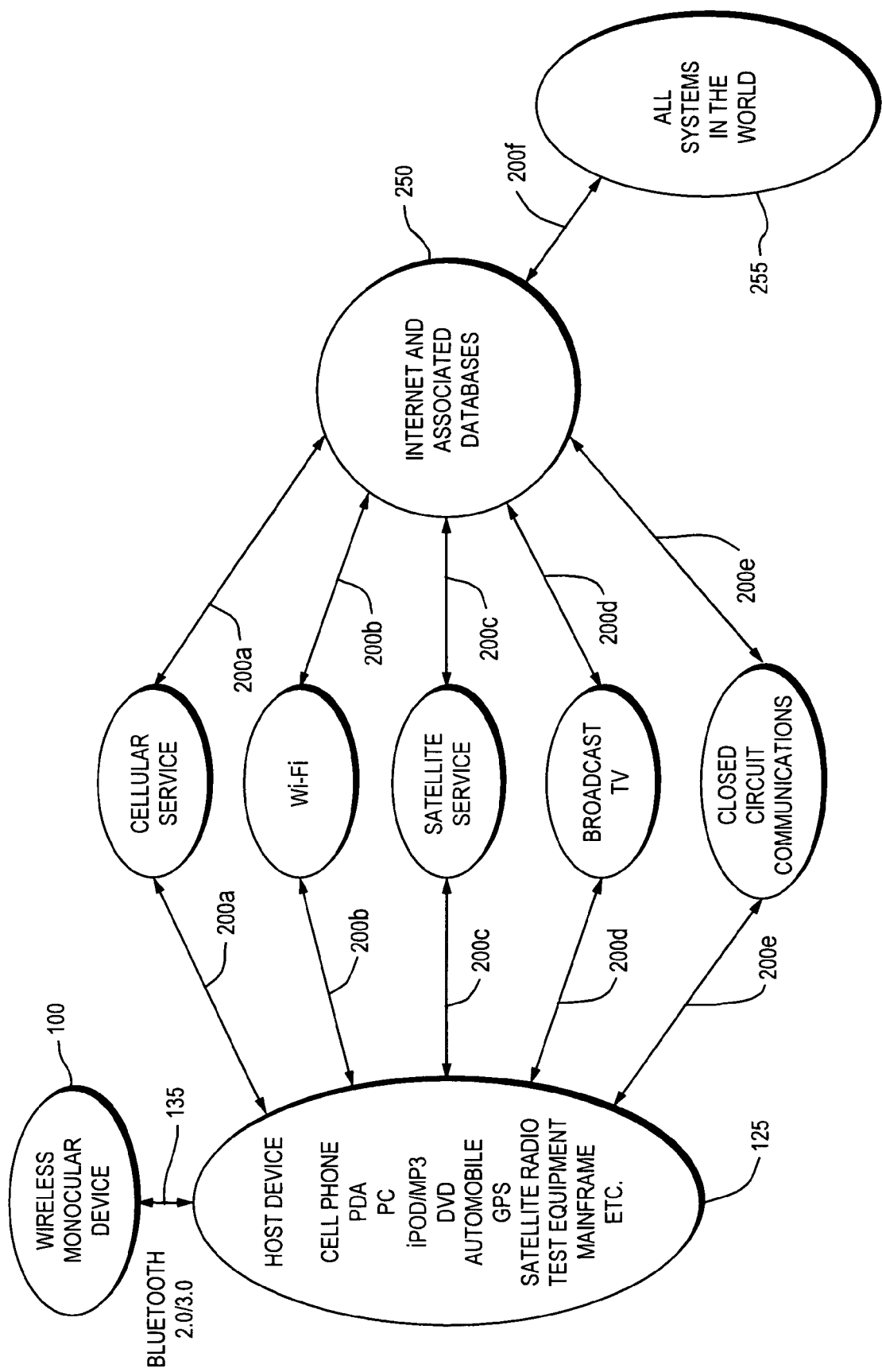
FIG. 2 is a network diagram illustrating communications between an example embodiment monocular display device and host computing devices, and communications between the host computing devices and other external databases and the Internet for delivery of multimedia content to the monocular display device.

FIG. 2 is a diagram illustrating an example embodiment monocular display device 100 interacting with a host computing system 125. The host 125 obtains information along a bi-directional communication path(s) such as cellular service 200a, Wi-Fi 200b, satellite service 200c, broadcast television 200d, and closed circuit communications 200e to the Internet 250 or associated databases 255 for which to display content on the display element 115 of the monocular display device 100.

In one embodiment, the communication path 200a may be a cellular mobile communication wireless path, and each path may be different or the same relative to the remaining bidirectional communication paths 200b through 200e. In one embodiment, the host computer 125 may obtain information using Sprint® EV-DO Wireless Broadband Connection, and then communicate with the monocular device 100 using a Bluetooth® wireless connection 135.

In another embodiment, the communication path 200b may be a Wi-Fi communication path, or similar radiofrequency signal communication link. The host system 125 may communicate with satellite services providers, digital video recorders, broadcast television providers, or closed circuit communication devices using paths 200c, 200d, or 200e, respectively. Paths 200a through 200e may also be associated with a public access wireless hot spot.

It is appreciated that the present monocular display device 100 may be compatible with NASCAR Nextel Fan View™ to watch closed circuit television of sporting events, and/or kangaroo.tv broadcast devices for displaying closed circuit television events. The present monocular display device 100 may be configured to receive live broadcasts, can receive multiple different broadcast views of sporting events in real time (of the same or different events), statistical information, and audio data.

The host system 125 may access a World Wide Web server on the Internet 300 along paths 200a, 200b, and obtain information, which is held and displayed to the display element 115 along communication link 135. In one embodiment, the data can be in a known data format such as, for example, Hyper Text Markup Language (HTML), Extensible Markup Language (XML), Joint Photographic Experts Group (JPEG), Waveform (WAV), Audio Interchange File Format (AIFF), Bitmap (BMP), Picture (PICT), Graphic Interchange Format (GIF), and Windows Media Video (WMV), or any other data format suitable for multimedia content including streaming video, and audio. The data can be obtained from the Internet from databases 305 along path 200f. Various communication path configurations are possible and within the scope of the present disclosure.

The host computer 125 can send and receive data along a wireless communication path 200b to the Internet and other system web pages or information databases 300 using HTML along bidirectional communication path 200b. The host system 125 may include Internet browsing software (such as know web browsers including, Microsoft Internet Explorer®, Opera®, Netscape Navigator®, and Mozilla Firefox®) to send and receive data along paths 200a and 200b. It should be appreciated that the host system 125 may be connected to the Internet by a cellular telephone network, and/or an Internet Service Provider Gateway Server.

Moreover, the present monocular display device 100 may be configured to receive push e-mail, pull e-mail or periodically forwarded e-mail from e-mail accounts, such as, for example MSN® Hotmail, Google® G-Mail, Yahoo!® mail, AOL® Mail, or any other e-mail provider or Internet site known in the art along path(s) 200a through 200e. In one embodiment, the wireless link 135, or communication paths 200a through 200e, may be compatible for use with a Staccato Communication® Ultra Wide Band (UWB) USB that includes a radiofrequency (RF) transceiver, a digital baseband, and an interface to provide for wireless connectivity up to 480 Mbps on a single chip footprint, which can be located in the monocular display device 100, or in the host computing device 125.

It should be appreciated that, in one embodiment, the host computing device 125 and the monocular display device 100 form a master/slave relationship with one another. The host computing device 125 can include a Microsoft Windows® OS that recognizes the monocular display device 100 as a secondary auxiliary display relative to the primary host computing device 125, and primary display. The host 125 may use the operating system to control the secondary monocular display device 100 in a wireless manner.

It should be appreciated that the monocular display device 100 may wirelessly interface with two or more host devices 125, such as a first computing device, and a second computing device, in a substantially simultaneous manner over at least two independent wireless communication paths 135. In this aspect, the monocular display device 100 may synchronize with the first computing device, the second computing device, and other devices so that the monocular display device 100 acts as a central hub.

In this aspect, the monocular display device 100 may initiate a first wireless communication path with the first device and also simultaneously initiate a second wireless communication path with the second device. The first and the second communication paths may be the same or different, and may configured over a Bluetooth® connection, or a modified Bluetooth® connection, or another protocol. In one aspect, the communication path may be a Bluetooth® 2.0 or 3.0 connection, an IEEE 802.11 or IEEE 802.15 wireless communication protocol, and the connection may be suitable to communicate over a number of channels simultaneously with a variable bit rate, and a variable buffer. In an alternative embodiment, the communication path may be a Bluetooth® connection, and the connection may be suitable to communicate over all channels simultaneously with a variable bit rate, and a variable buffer.

The first computing device, and the second computing device can be any of the previously mentioned computing devices, such as a laptop, a server, the Internet, a desktop, a Smartphone, a mobile phone, a music player, or any other mobile or non-mobile device, and various computing devices are possible and within the scope of the present disclosure. Preferably, using the monocular display device 100, the viewer may control the device 100 to remotely interrogate a first computing device over a wireless Bluetooth® connection to pair with the first computing device. Thereafter, the device 100 may output control program instructions to the first computing device to perform functions at the device 100. In one aspect, the communication path may be a Bluetooth® connection, and the connection may be suitable to communicate over a number of channels simultaneously with a variable bit rate, and a variable buffer. The path can be suitable to communicate video, audio, graphics, or any data.

Thereafter, the device 100 (while communicating with the first computing device) can also interrogate a second computing device over a wireless Bluetooth® connection to pair with the second computing device. This may be accomplished using a different or the same wireless interface. Thereafter, the device 100 may output control program instructions to the second computing device. In one aspect, the communication path may be a Bluetooth® connection, and the connection may be suitable to communicate over a number of channels simultaneously with a variable bit rate, and a variable buffer. The path can be suitable to communicate video, audio, graphics, or any data.

Various computer communication configurations are possible and within the scope of the present disclosure, and device 100 may be configured to control any number of other computing devices, and/or peripheral devices, such as, for example, a wireless headset, a wireless memory, wireless speakers, etc. For example, the device 100 can independently pair with two cell phones simultaneously. In this manner, the wearer may make independent calls using the two cell phones using program instructions transmitted from monocular display device 100.

Alternatively, the device 100 can pair with a cell phone and a laptop computer having a wireless modem to make a call using the cell phone using the device 100, while controlling the laptop computer to play video, which is transmitted over a Bluetooth connection to be displayed on device 100. Various configurations are possible and within the scope of the present disclosure, and it should be appreciated that the device 100 may control three or more devices, or more by establishing more than one wireless communication link.

Figure 3:
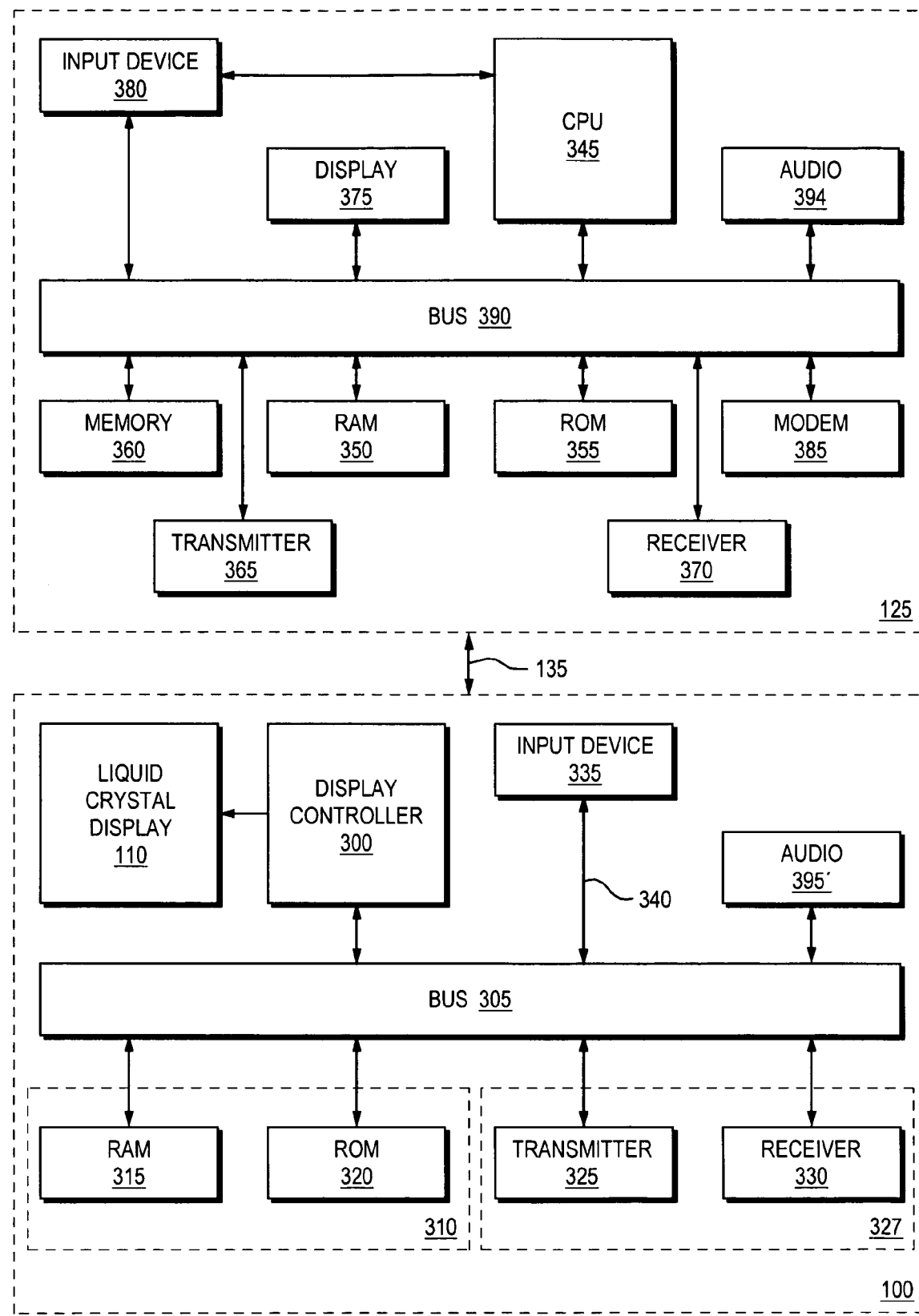
FIGS. 3-4 are block diagrams illustrating simplified schematic drawings of internal components of example embodiment monocular display devices and host computing devices adapted to wirelessly transmit data over a bidirectional communication path.

FIG. 3 illustrates a simplified block diagram of a non-limiting example embodiment of the present monocular device 100, for illustration purposes. The monocular display device 100 includes a display element 110 connected to a display controller 300, which may be a digital signal processor made by Intel®, Freescale Semiconductor®, or Advanced Micro-Devices (AMD)®, or another controller connected to a bus 305, such as a Peripheral Component Interconnect (PCI) bus. In one embodiment, the display 110 may be connected to a video graphics card (not shown) which is connected to the bus 305. The video graphics card can be an Accelerated Graphics Port (AGP) video card that fits to an AGP video card slot in the device 100. The monocular device 100 also includes memory 310, such as a random access memory (RAM) 315 and a read only memory (ROM) 320 which saves executable program instructions, and communicates the program instructions to the controller 300 through bus 305. Preferably, the monocular device 100 further includes a transmitter 325 and a receiver 330, and/or a combined transceiver (not shown), both of which are connected to the bus 305 to form a wireless interface with the host computing device 125. The transmitter 325 and receiver 330 also are connected to the display controller 300 and receive instructions for control thereof.

The monocular display device 100 also includes an input device 335 which can be a wireless mouse, trackball, or keyboard, or other similar wireless device that may be wirelessly connected to the PCI bus 305 by a wireless link 340, which is received by the receiver 330. Alternatively, the input device 335 may be connected in a wired manner (not shown) to the bus 305 to provide an input signal to the controller 300. The input device 335 may control screen prompts on the monocular display device 100, the host device 125, or both the monocular display device 100 and the host computing device 125 with the monocular device 100 and the host 125 in a master/slave networked relationship.

The monocular device 100 interrogates an external or host device 125 and is configured to establish a wireless link 135 with the host device 125 such that the host device 125 can provide uplink and downlink data to the monocular device 100 in a bidirectional manner across the wireless link 135. In one embodiment, the monocular device 100 can receive uplink data that is suitable to display graphical multimedia information on the display 110 of the monocular device 100.

The host computing device 125 includes a central processing unit 345, a memory having a RAM 350, a ROM 355, and also including a cached memory 360. The computing device 125 further includes a transmitter 365 and receiver 370, and/or a combined transceiver (not shown). The host device 125 may also include a primary display 375 and an input device 380 which are both connected to a bus 390, such as a PCI bus, as shown. It should be appreciated that the bus 390 may be connected to a wired broadband connection (not shown), or a wireless broadband connection 385, a DSL line, a cable modem, a media player, a music or video player, or any other suitable link to receive data from a database.

During an initial stage of operation, a bi-directional wireless link 135 is established between the transmitter of the monocular display device 325 and the receiver of the host device 370 and an authentication process occurs across the wireless communication path 135. Thereafter, the monocular device 100 can wirelessly communicate with the host receiver 370 over a wireless communication link 135, and the host transmitter 365 can transmit signals to the monocular device receiver 330. In one embodiment, the monocular display device 100, from its transmitter 325, may wirelessly communicate with the host receiver 370 using a Bluetooth® 2.0 or 3.0 wireless radiofrequency standard. In another embodiment, the monocular device 100 may wirelessly communicate using a wireless Ultra Wide Band communication link 135, or using short-range radio frequency signals 135.

In one non-limiting embodiment, the central processing device 345 associated with the host computing system 125 executes program instructions and uses Microsoft Windows SideShow® to interrogate the monocular display device 100 to allow the monocular display device 100 transmitter 325 and receiver 330 to access the cached memory 360 of the host computing device 125. The contents of the cached memory 360 is then communicated to the bus 390 and to the transmitter 365. Controller 345 outputs a control signal to transmit data from the transmitter 365 to the monocular display device 100, and to display multimedia on the monocular display 115 when the host computing device 125 is off, or without power. Upon receipt by the receiver 330, the receiver 330 communicates with bus 305 to transmit the received data to display controller 300.

Display controller 300 outputs control signals to the display 110 to display images. This allows the monocular display device 100 to receive data stored on the cache memory 360 of the host computing device 125. When the host computer 125 is not in use, or switched off, the data viewed on the monocular display device 100 is from the cached memory 360, and not updated. This data may be slightly older and not refreshed through the communication links 200a through 200e, as compared with when the host computing device 125 is operational. It should be appreciated that the monocular display device 100 and the host computing device 125 also include audio devices 394, 395 that receive a control signal and play audio in response thereto.

Microsoft Windows SideShow® is configured to recognize multiple other secondary displays 100 separate, or remote from, the host computing device 125. The display element 110 of the monocular display device 100 can be used to view multimedia, run executable code, run applications, view email, view calendar applications, and other host computing data, which is transmitted over the wireless link 135 to the monocular display device 100, even if the host computing device 125 is off, or without power.

Alternatively, the monocular display device 100 may be configured to be used as a secondary display together and at the same time with the host computer 125 in a networked arrangement. Thus, using the input device 335 of the monocular display device 100 and the display element 115, the user may access data on the host computer memory 360 and run applications using the processor 345 of the host computer 125 all from the secondary display element 110 of the monocular display device 100 in a master/slave relationship, which can display a different display relative to the primary display of the host computer 125.

Figure 4:
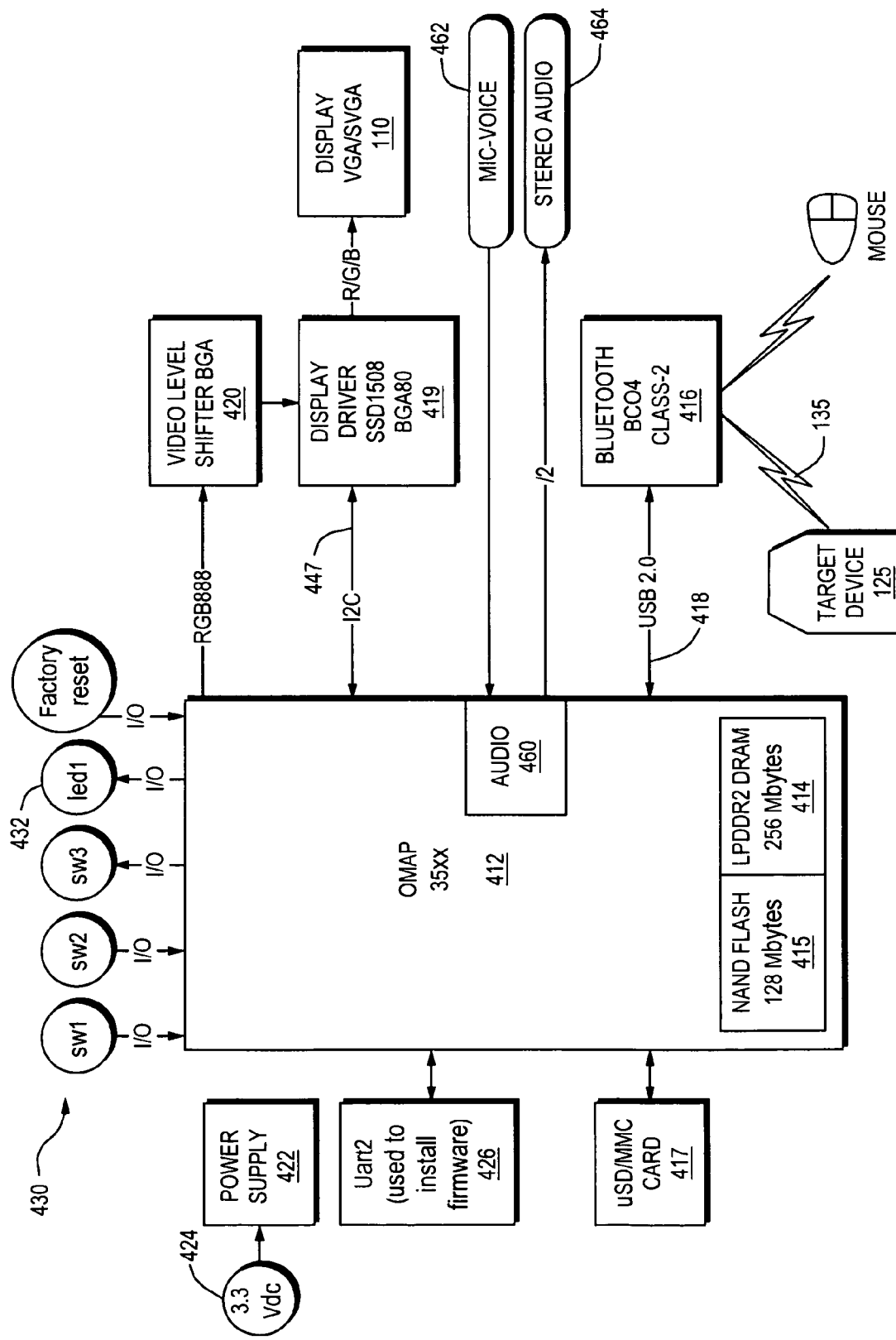

FIG. 4 provides a more detailed view of the electronic components incorporated into the wireless headset display device 100, which is connected to host system(s) 125 to receive a digital video signal over a Bluetooth connection. These components are described in greater detail in a co-pending patent application 61/010,177 filed Jan. 4, 2008, entitled "PROTOCOL FOR TRANSPORTING VIDEO SIGNAL OVER BLUETOOTH WIRELESS INTERFACE", which is incorporated herein by reference in its entirety.

In the preferred embodiment, the headset 100 includes an Advanced Reduced instruction set computer (RISC) Machine (ARM)/Digital Signal Processor (DSP) 412 (which may be an Open Multimedia Application Platform (OMAP) 3500 series processor, available from Texas Instruments of Dallas, Tex.), memory 414, Bluetooth interface 416 which may be provided by a Class 2 Bluetooth interface available from Cambridge Silicon Radio (CSR) of Cambridge, England), display driver 419 (which may, for example, be an SSD1508 display driver available from Kopin Corporation of Westborough, Mass.), video level shifter circuits 420, a power supply 422 supported by a batter 424, universal receiver transmitters (UART) 426 (such as may be used for debugging) and memory 415. A Secure Digital (SD), eXteme Digital (xD), USB SD (uSD) memory 417 or other similar interfaces may be used to store application programs, kernel directives, or configuration data, and/or connect to devices such as a digital camera. A number of buttons 430 may be associated with the device (e.g., switch 1/switch 2/switch 3 and reset inputs) and an LED output 432 (led 1). A VGA or better quality display 110 and audio input and output device(s) 460, which may include microphone input 462 and stereo outputs 464, are also provided.

The signal may be sent over the Bluetooth wireless connection established using Serial Port Profile (SPP) from the device 100 to the host 125, as opposed to using any of the "advanced" Bluetooth modes, which provides greater throughput higher than the higher layer protocols imposed by such advanced modes that have been found not to be needed in this application. In the Bluetooth Radio 416, the video signal received over the Bluetooth connection is sent over the USB connection 418 from the interface 416 to the ARM/DSP 412.

One design consideration is to optimize data packet format, given known data buffer sizes. Internal to the CSR chip 416 is a packet buffer default size of 1000 bytes. This may be modified to force streaming video signals to use only about a 990 byte buffer size.

The processor 412 may expect the received video content to be encoded with the H.264 (Motion Picture Experts Group (MPEG)-4 part 10) formatting, using the so-called baseline profile or better.

In a preferred embodiment, the ARM/DSP processor 412 may use a multi-tasking embedded operating system. The processor 412 operates on the received video signal as follows. An MPEG format container file (e.g., a .MP4 file) is made available.

In one preferred embodiment, this can be a proprietary file format, although the specific details of the input .MP4 file format chosen are not important here, as long as the DSP 412 is programmed to correctly process it. The processor 412 then opens a communication port to the host system 125 and receives the file over the USB interface 418 from the Bluetooth transceiver in the CSR chip 416.

An MP4 decoder in the DSP 412 strips the file into respective audio and video streams. More particularly, the DSP 412 decodes the input file H.264 compressed digital video signal into a YCbCr baseband component video signal. The ARM/DSP 412 can also divide the associated compressed audio (formatted as an Advanced Audio Coding (AAC) format signal) into baseband stereo audio.

The ARM/DSP 412 can output video in any suitable format such as as an 8 bit, International Telecommunication Union Radiocommunication Sector (ITU-R) Recommendation BT. 656 or Society of Motion Picture and Television Engineers (SMPTE) 293M 16 bit YUV progressive scan with separate sync signals, to the display driver 118.

The decompressed video signal can be forwarded over an internal ARM bus of the processor 416. The ARM bus then sends the content directly to the display driver 419 via the SMPTE 293M interface. The Intelligent Interface Controller (I2C) interface 447 is used to configure the display 110.

The ARM 412 also outputs the baseband audio to the audio output Compression/Decompression Module (CODEC) 460. It may take mono or stereo audio input and produce suitable stereo output signals.

Figure 5:
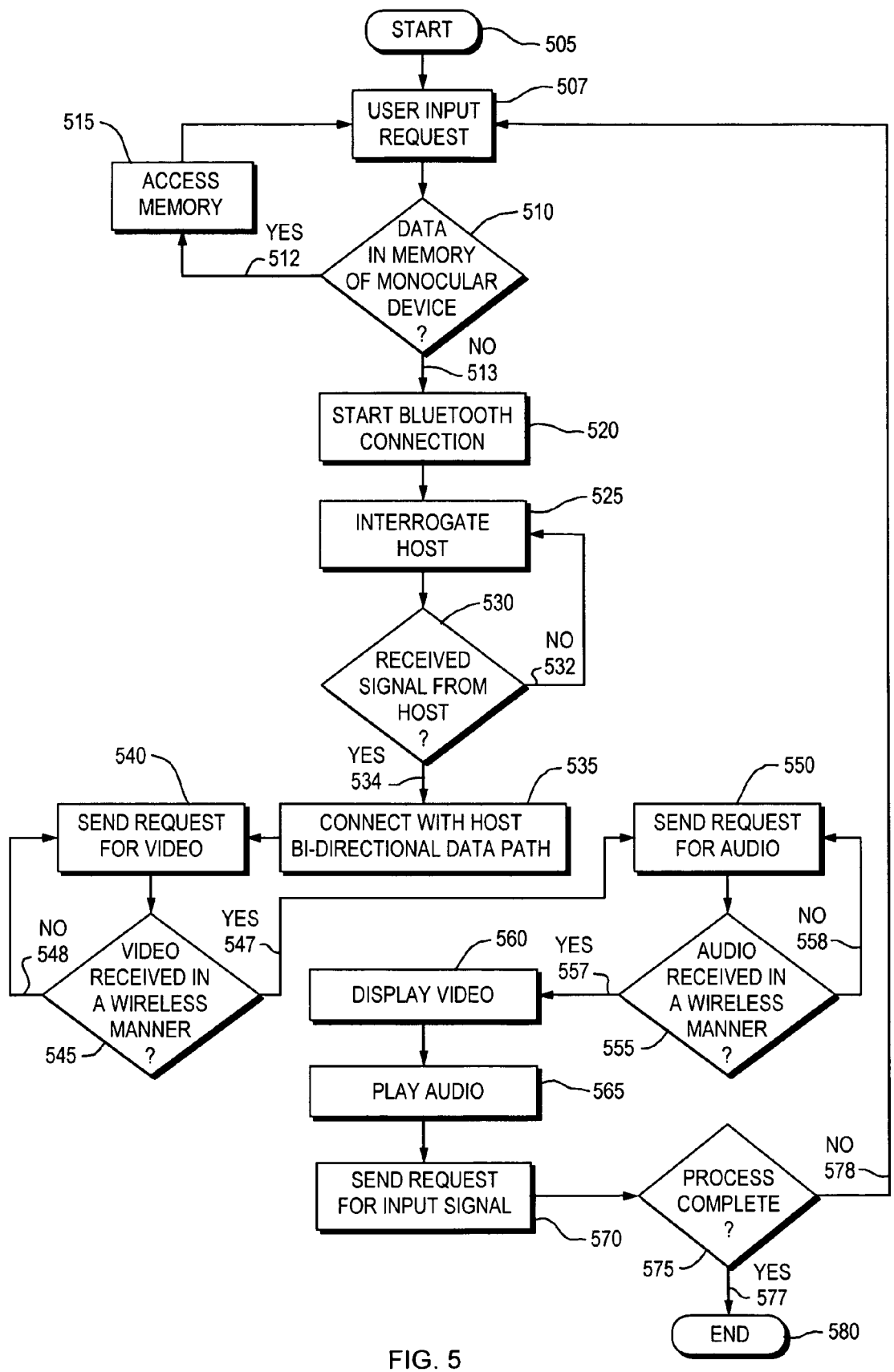
FIG. 5 is a flow chart illustrating operation of an example embodiment monocular display device.

FIG. 5 is a flow chart of a method 500 of operation according to an embodiment of the monocular display device. The method commences (505). Thereafter, the monocular display device awaits (507) a user input request. This input can be any signal output from an input device, such as, for example, an output from a wireless trackball, a wireless mouse, or a wireless key pad, or a button located on the housing of the monocular display device (e.g., housing 105 of FIG. 1). In one embodiment, using an operating system, such as, Microsoft Windows Mobile® operating system, and using a wireless mouse, the user may double click an icon on the monocular display device screen (e.g., screen 110 of FIG. 1) to indicate to open an electronic mail message, or to open an application. Thereafter, the method 500 attempts to receive data from a source of content, in response to the request, and the method will determine (510) whether the content source is located in a memory on the monocular display device (e.g., memory 310 of FIG. 3), such as, for example, on a camera output, or whether, the source is located at another remote location, such as, on the host computer (e.g., host 125 of FIG. 1). If the data is indeed stored locally (512) and no wireless link is needed, then the local memory is accessed (515) and the data is configured to be retrieved and loaded for subsequent display on the display element. Once the method 500 accesses the local memory (515), the method 500 returns to wait for a new user input request (507).

However, if the data is located on a remote memory or in a memory not located on the monocular display device (513) then a Bluetooth® connection, or other previously described wireless connection(s), is started (520) to obtain the data as requested (507). It should be appreciated that other wireless communication formats may also be used, as previously discussed, and the present method 500 is for illustration purposes only.

The device's transmitter (e.g., transmitter 325 of FIG. 3) may be activated to interrogate (525) the host computing device, and to send an initial configuration signal to the receiver (e.g., receiver 370 of FIG. 3) of the host computing device. The host determined whether the Bluetooth® signal is sufficiently powered and was received (530) from the monocular display device 100. Once the signal is received, the host transmitter (e.g., transmitter 365 of FIG. 3) will send a confirmation signal to the monocular device receiver (e.g., receiver 330 of FIG. 3) by using a second predetermined signal. If the signal was not received (532), then the monocular display device continues to interrogate the host (525). A stronger or more directive signal will be sent. If the signal is correctly received (534) by the host computing device then a bi-directional communication data path is formed (535) across the wireless link (e.g., wireless link 135 of FIG. 3). Uplink and downlink signals may be communicated across the bidirectional connection data path to and from the devices (e.g., monocular display device 100 and host 125 of FIG. 3), the present method being merely illustrative as various diagnostic, utility applications and signals that may be sent along the wireless link in addition to the non-limiting method of FIG. 5.

Once the bi-directional communication data path is formed (535), multimedia data files may be communicated from the host computing device to the monocular display device. In one non-limiting embodiment, the bandwidth of the communication path is sufficient in bits per second that, when operating Microsoft Windows Vista® Operating System at the host computing system, the graphical output of the host display output screen (e.g., host display 375 of FIG. 3) is visible in real time at the display element (e.g., display 110 of FIG. 3), such that if both displays were held side by side, a cursor movement would occur on both screens substantially simultaneously to enable remote operation of the host computing system at the monocular display device.

The display controller (e.g., controller 300 of FIG. 3) sends (540) a request for a video signal from the computing device. The request is communicated to the bus 305, and to the transmitter and then sent across the link. Thereafter, the monocular display device determines (545) whether the video signal was received from the host computing system in a wireless manner. If the signal was wirelessly received (547), then the monocular display device requests audio (550). If the signal was not received in a wireless manner (548), then the monocular display device returns to send another request (540).

The display controller sends a request for an audio signal (550) from the host computing device. The audio and the video signal may be sent as one continuous signal and the present disclosure is not limited by any such two signal embodiment. The request is communicated to the bus (e.g., bus 305 of FIG. 3), to the transmitter, and then sent across the link.

The monocular display device then determines (555) whether the audio signal was received from the host computing system in a wireless manner. If the audio signal was wirelessly received (547), then the monocular display device displays video (560). If the audio data or signal was not received wirelessly (548), then the monocular display device returns to send another request (550).

The program instructions cause the monocular display device to display video (560) on the display by the display controller, preferably in the peripheral vision of the user, and play audio (565) using the audio device (e.g., audio device 395 of FIG. 3). Thereafter, a request for a further input signal is sent (570). It is then determined (575) whether the process is complete. If the process is complete (577), then the method ends (580). If the process is not complete (578), a further user input request is awaited (507). Various control configurations are possible and within the scope of the present disclosure, and the present configuration is for illustration purposes only, and it is envisioned that multiple other steps for encryption, and to decipher host computing or other external computing device formats are also envisioned.

Figure 6:
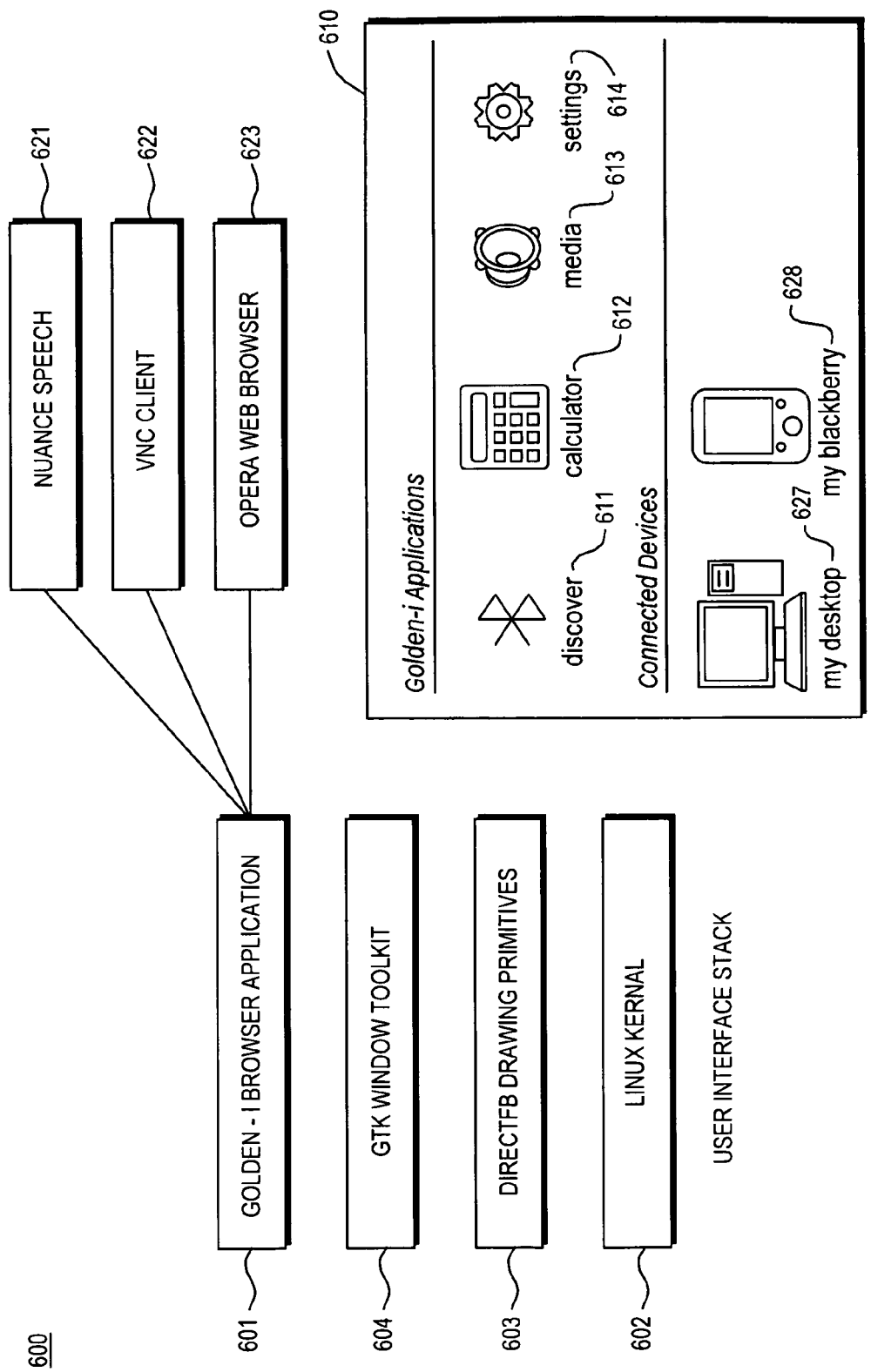
FIG. 6 is a high level software diagram indicating how the monocular display device can be used to control and manage various hosts through a user interface.

FIG. 6 is a high level software diagram indicating how the monocular display device 100 can be used to control and manage various hosts 125 through a user interface. A software stack 600 includes a device application browser 601 which may run on top of the kernel of an operating system (OS), such as a Linux kernel 602, drawing primitives, such as those provided by a Direct FB (DirectFB) stack 603, and a graphical tool kit, such as a Gimp Tool Kit (GTK) window tool kit 604. The device application browser 601 allows a user to access application software for wireless video headset 100 through an icon and menuing interface. This typically consists of custom code written for the particular device 100.

The OS 602 is ported to run on the processor in the wireless video headset 100, such as the OMAP 3500 series ARM/DSP shown in FIG. 4. The kernel level 602 otherwise provides standard operating system functions. The drawing primitives layer 603 may be a somewhat thin graphical library that provides for graphic acceleration input device handling and abstraction integrated windowing system. The end result is a graphical user display, such as that shown in item 610 which has various applications available to the user, such as Bluetooth™ discovery 611, a calculator 612, media player 613 and a settings interface 614.

Applications running within the context of the device application browser 601 may include a speech input 621, a Virtual (Desktop) Network client 622, and a web browser 623. Virtual Network is a system that allows a personal computer (PC) to be controlled remotely. It does this by exporting an entire screen display to another device in the form of a bitmap. This bitmap is wrapped in a network protocol and received by the device and simply displayed. Similarly, any mouse movements or keyboard entry data detected by the local device are passed directly to the remote PC to be acted upon.

The speech command interface 621 provides or allows for voice input commands to control the application browser 601. Thus, for example, a user may say the word "calculator"—where this is then detected by the speech device, the operating system 602 launches the calculator application. In general, text labels displayed next to on-screen buttons or icons within the context of the application browser indicate a spoken word which will activate the corresponding button.

Digital inputs (switches) can also be used to navigate and select menu functions allowing for full control and editing of applications and associated data.

Discovery application 611, as will be understood shortly, allows not only for discovery of neighboring Bluetooth™ devices but also connecting them through to the application browser level. For example, shown in the example user display 610 is the fact that there are presently two connected devices, including a desktop computer 627 and a Blackberry™ 628. The devices 627, 628 have been discovered through operation of the discover application 611. This may be, for example, initiated on first power up of the wireless headset device 100 or by a user manually initiating a Bluetooth™ discovery process. The Bluetooth™ device discovery proceeds as per the Bluetooth™ specification, reporting any new Bluetooth™ layer devices as they are connected at a physical layer.

At this point, however, additional functionality is provided to permit communication with the Bluetooth™ devices at a network level. In particular, a client 627, 628 is told to open a special port on a localhost: address that is local to the wireless headset device. This device port acts as a proxy, always looking for such requests. When a request is received, it reports back an available network level address (i.e., such as a TCP/IP address) to be used by an individual device 627, 628 for network level communication.

FIG. 7 illustrates hardware interface functionality 700 also provided by the browser application 601 of FIG. 6 which may receive and/or control various hardware functions on the device 100. Such functions may include headset detection 701, battery status 702, output device adjustment, such as headset button 703, speaker volume 704, microphone volume 705, media streaming functions 706, frame buffer switching 707, device drivers, and like functions.

FIG. 8 illustrates a standard Bluetooth protocol stack implemented in the Bluetooth link 137 of FIG. 1, with the addition of a special proxy function. The Bluetooth™ layer does provide for discovery of Bluetooth™ devices 800 as in any standard Bluetooth™ device. However, headset devices 100 connected 810 will also provide for protocol information permitting data exchange with such devices 812. It can also connect to other types of headset devices 820, such as telephone headset devices which may provide for handling of incoming calls 822 and outgoing calls 824.

Figure 10:
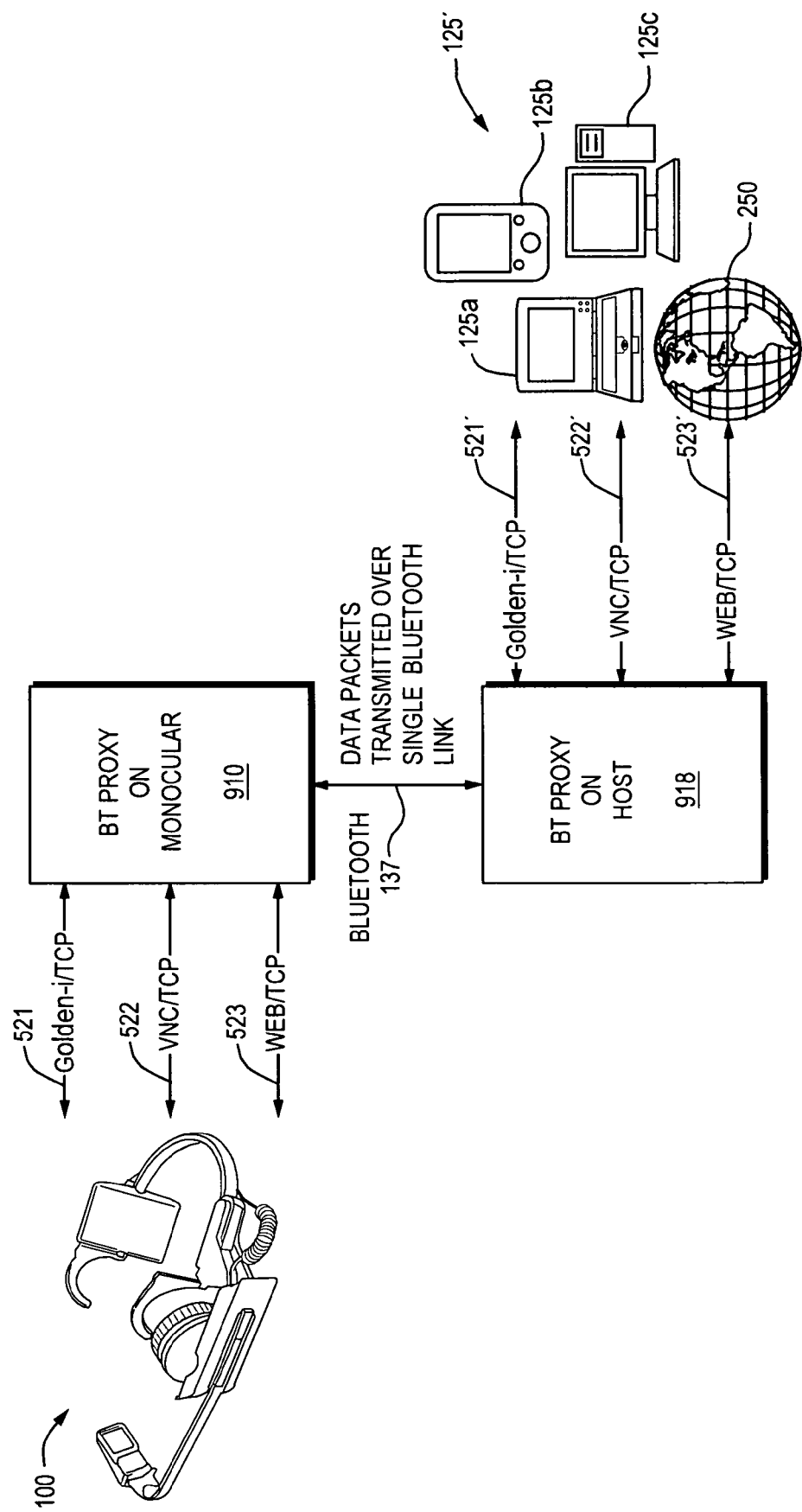

FIGS. 9A-9B and 10 show more detail of the proxy functionality provided by the Bluetooth™ interface 137.

FIG. 9A illustrates a traditional approach involving multiple direct TCP-layer connections to data sources. For example, each application running in the context of application browser 601 of FIG. 6, such as a speech recognition application 621, virtual network client 622, and a web browser client 623, might each require one or more TCP connections to the data sources provided by hosts 125'. Traditional systems involve multiple direct TCP connections to data sources.

FIG. 9B illustrates how, although Bluetooth™ itself does not provide any direct connection to the Internet 250 or other high layer networks, a connection between the monocular display device 100 and the internet 250 may be supported by a proxy 930 via an Internet enabled device 125. Bluetooth cannot connect directly to Internet; it must be proxied via an Internet enabled device. Thus, for example, applications such as the web browser 623 typically require host devices 125' to act as a networking proxy.

FIG. 10 illustrates a preferred arrangement in which a single Bluetooth link 137 supports multiple applications 621-623. The multiple application 621-623 require that the single Bluetooth™ connection 137 support multiple sockets, such as Transmission Control Protocol (TCP) connections. For example, while each application 621-623 might otherwise require multiple TCP connections, instead the Bluetooth™ proxy layer 1010 added between the standard Bluetooth™ layer and regular TCP protocol layer funnels the multiple requested TCP connections onto a single socket. The single socket provided by Bluetooth™ link 137 then transports the multiple connections to the host.

A similar inverse functionality 1018 provided on the host side 125 to unravel packets to their respective connection 621'-623'.

While Bluetooth™ itself does allow for multiple connection sockets between a host and client, many mobile phone operators impose a single connection limit. Thus, a single connection limit must be observed in many instances. This permits not only greater security, but avoids the possibility of having a wireless device be swamped with Bluetooth™ connection requests.

This approach also permits a standard web browser application 623, for example, to operate without requiring modification to its use of TCP sockets. Thus, the operation of the Bluetooth proxy 1010 provided on the client 100 and proxy function 1018 provided on the hosts 125 insulate the applications 621-623 running within application browser 601 and also insulate the applications running on hosts 125 from such modified socket functionality. For example, the virtual network running on the host 125 now need not be modified.

Figure 11:
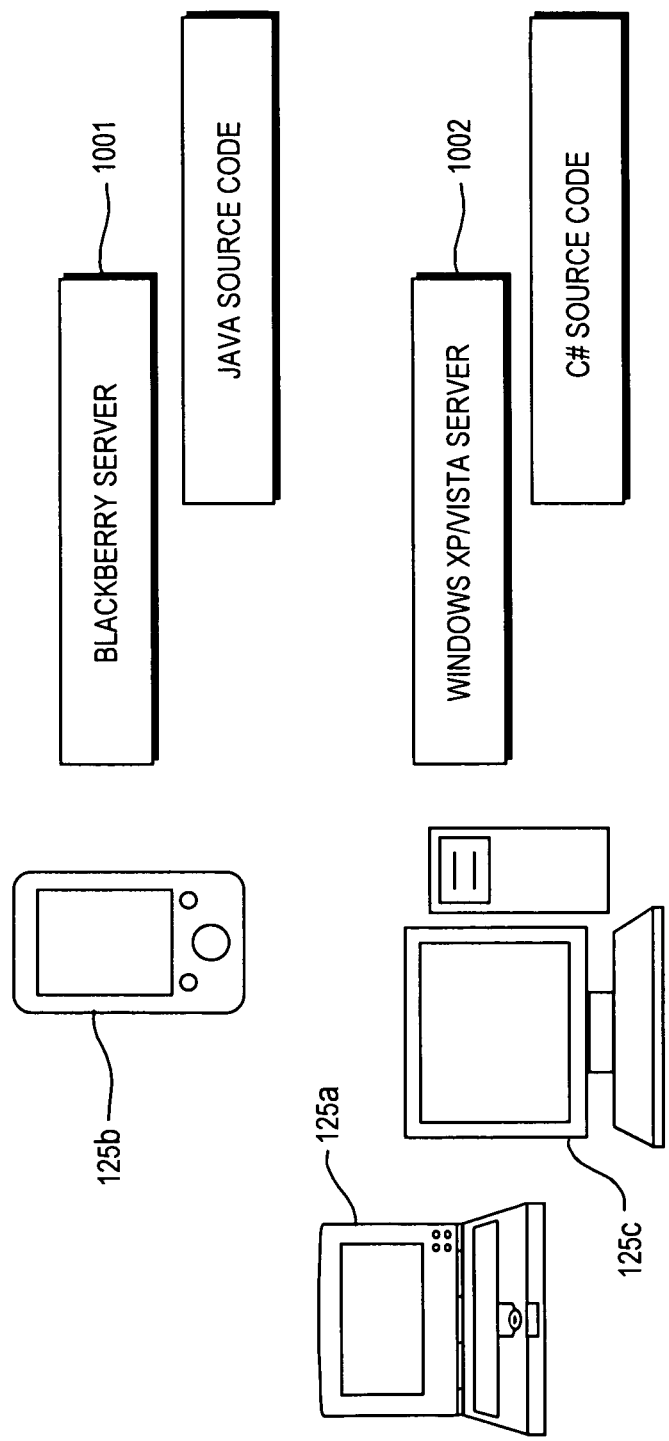
FIG. 11 is a block diagram illustrating device drivers.

FIG. 11 illustrates device drivers provided to insulate the device application browser 601 from having to know specifics of content format for particular host devices. Thus, for example, a Blackberry server 1101 is provided for a Blackberry host 125b, and a Windows Vista server 1102 is provided for a Windows machine host 125c. This allows the user interface specifics for particular hosts 125 to be presented as a generic interface to the wireless headset device 100. The servers 1101, 1102 provide at least two functionalities, including the Bluetooth™ proxy functionality 1118 of FIG. 10 (i.e., unpacking TCP channel data into multiple required channels) and a content server.

Figure 12:
FIG. 12 is a block diagram illustrating device content.

FIG. 12 illustrates processing of device content by the servers 1101, 1102. These may include a content format piece for each type of respective content including email inbox 1201, contact list 1202, stock ticker 1203, media browser 1204 and the like. Each of these server functionalities 1201-1204 reformats its content using a page markup language. The page markup language can then be interpreted by the content browser 601 on the video headset device. The content browser 601 may now interpret the page markup language generically to fit the various requirements of the video headset device 100.

In alternate embodiments, a function such as a Windows Sideshow™ server may take formatted content from a Windows device and format it according to Sideshow requirements. Windows Sideshow is a technology introduced with the Windows Vista release of the Microsoft® operating system that enables Windows PC to drive a variety of auxiliary display devices connected to a main PC. These devices can be separate from or integrated in to the main PC, e.g., and display embedded on the outside of the laptop lid, etc.

With the virtual network and/or sideshow functionality, the wireless headset device can also become a "chameleon", in effect taking on the same user screen, same graphical user interface, and familiar user control of the host device. Even if the device 100 accepts several hosts at the same time (i.e., a blackberry, a cell phone, and a PC), the user is permitted to switch between the host devices. Each time a user makes such a switch, the user can see and still recognize the familiar slave or host and device user screen, the same graphical user interface (GUI), and same familiar controls and commands.

It is thus now understood how content can be viewed by the portable video headset 100 in different ways, all selectable by the user, including:

new applications written for the device itself; device applications, web applications, a web browser, etc.; and Microsoft® Sideshow applications, or native applications via a virtual network connection.

With the Bluetooth proxy support, the effect of pushing through original hosted device GUI interface, screens, command and control interfaces, can be supported for multiple devices at the same time.

Figure 13:
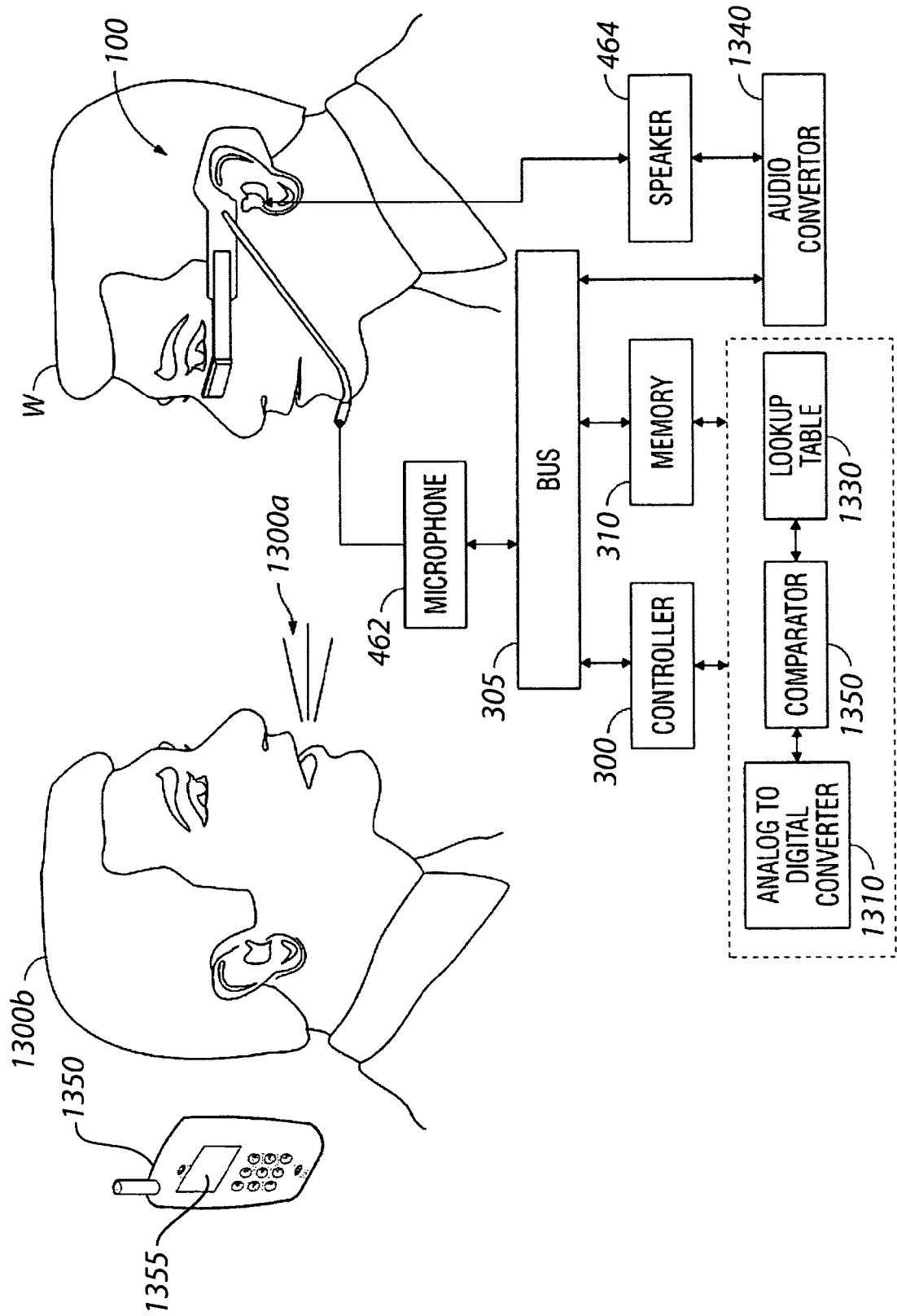
FIGS. 13 through 15 show an embodiment of the head mounted display being used as a translator device with voice modulation.

Turning now to FIG. 13, there is shown an alternative embodiment of the multifunctional monocular display device 100 showing a schematic of components of the device 100. Various components are envisioned and the shown components form no exhaustive list of the components, and are not limiting. In this embodiment, the monocular display device 100 preferably can be used as a translator device for translating, or assisting with translating one foreign language 1300a spoken by a first entity 1300b to a second language that is understood by the wearer W. The monocular display device 100 can receive an audio input 1300a from a first source 1300b, such as a natural speaker, audio source, communication device, e-mail, video source, or telephone. In response, the monocular display device 100, can convert this audio 1300a into a different second language in a format that is understood by the wearer W. This converted translated audio is then displayed in a text format or is emitted in an audio format for the benefit of the wearer W of the monocular display device 100.

In yet another embodiment of the present device 100, the device 100 may not only output the translated text in the form of audible speech from the speaker(s) 1345, but the device 100 may also output the translated text from an external device. For example, the wearer W may arrive in a foreign country and desire to use the device 100 as a translation tool for speaking with a foreign taxi cab driver. Instead, of outputting the translated text or speech from the device 100, the device 100 will control a second peripheral device 1350 associated with the driver, and then output the translated text from that second device 1350, such as, the taxi cab driver's cell phone 1350, instead of the worn device 100.

In this embodiment, the device 100 may communicate over a radiofrequency signal to pair with an external device 1350 and output translated text to the external device(s) 1350 for the benefit of the foreign speaker 1300b in real-time. This second external device 1350 may be associated with the foreign speaker 1300b. For example, at the initial outset of use, the device 100 may include program instructions to interrogate external device(s), such as a monitor, a Personal Digital Assistant, a notebook computer, a portable music player, a remote speaker, a cell phone, a mobile Smartphone, or any other device having a transceiver or a receiver, and that is capable of the wireless communication of data. The device 100 may pair with the external device using a known protocol standard such as BLUETOOTH® 1.1, 1.2, or any other wireless communication protocol known in the art. Thereafter, the device 100 may then deliver radiofrequency signals to the external device to control the external device to output the translated speech (which is input to the device 100) to the foreign speaker 1300b using that peripheral device 1350 instead of using the speaker 1345.

In yet another embodiment, the device 100 may pair with the external device and then use that external device 1350 for processing and to output the translated speech or text. The device 100 may output the received speech to the remote device, and the translation, itself, may occur at the external device 1350, and the translated speech may be output from the speaker 1345 associated with the device 100 or the translated speech may be output from speakers 1355 associated with the external device 1350 or a third device (not shown). In this manner, the wearer W may leverage available peripheral devices to use with the device 100, and can provided translated speech from one or more multiple peripheral devices 100, 1350.

Generally, the multifunctional monocular display device 100 coverts the initial audio input 1300a from the foreign speaker or a first source 1300b into data. Thereafter, the device 100 uses a computing device 1325 (located remotely or located directly in the device 100) to make a comparison between the received audio data and stored reference data in a memory 310.

In one embodiment, a translation lookup table 1330 is consulted using a comparator 1320. Comparator 1320 may be a software program, or a discrete digital device. The translation lookup table 1330 with comparator 1320 has program instructions to convert the audio input data from a first language to a second language. This translation lookup table 1330 may be any translation software known in the art, such as, for example, a translation software associated with NUANCE COMMUNICATIONS, INC.® of Burlington Mass., ALTAVISTA® BABEL FISH SOFTWARE®, SYSTRAN® SOFTWARE, software associated with GOOGLE TRANSLATE®, IBM® WEBSPHERE TRANSLATION®, or any other software translation having program instructions for translating from between at least two or more languages.

The translated language corresponding to the audio data from the foreign speaker 1300b, which is converted, is then preferably output to one or more peripheral devices. These peripheral device are associated with the monocular display device 100. These peripheral device(s) can be one or more devices configured for a visual output (displayed in a screen), data output, or associated with device configured for an audio output (a speaker). It is envisioned that the output can be displayed in more than one format. Optionally, the output may be recorded using a memory 310 associated the monocular display device 100 for later retrieval and playback. In a further embodiment, the output or translation of the foreign language can be refined and modulated in a pleasing audio format for the benefit of the wearer of the multifunctional monocular display device 100.

FIG. 13 show a schematic view illustrating a schematic of a number of components of the device 100 where the monocular display device 100 preferably includes a microphone 462, and a speaker 464, which are operatively connected to a PCI bus 305. Controller 300 and a memory 310 are operatively coupled to the bus 305 to provide control instructions to the various components. Preferably, the device 100 accesses suitable program instructions to receive the audio signal 1300a from the microphone 462. Controller 300 converts the audio signal 1300a to digital data using an analog to digital converter 1310.

The controller 300 further has program instructions to control a comparator 1320, which compares the digital data from converter 1310 with a language lookup table 1330 to convert and translate the digital data to another different language. It should be appreciated that language lookup table 1330 may be extensive and include substantial amounts of data for referencing one or more languages, such as English to French, English to German, German to Japanese, Korean to Japanese, etc.

The converted data from translation lookup table 1330 is then output to a memory 310. The controller 300 may further convert the converted language data received from the translated lookup table 1330 to a second audio signal using an audio converter 1340. The second audio signal can then be output by the controller 300 to a speaker 464. The speaker 464 can then output the converted signal to the user by using an earpiece or ear bud, or discrete speaker component as shown in FIG. 13, or as previously described.

In this aspect, the monocular display device 100 can be used as a translator device, in which a first individual 1300b speaking a first language 1300a may be situated in the same location with the wearer W, and be speaking a first language 1300a such as Japanese. In this embodiment, the wearer W can hear the audio signal 1300a from the foreign speaker 1300b in a different language from speaker 464, such as, in English, and preferably in real time. In another embodiment, audio signal 1300a is received by microphone 462 may be converted to a digital file by analog to digital converter 1310, then is translated and also stored in a memory 310 for later retrieval, and inspection.

Figure 14:
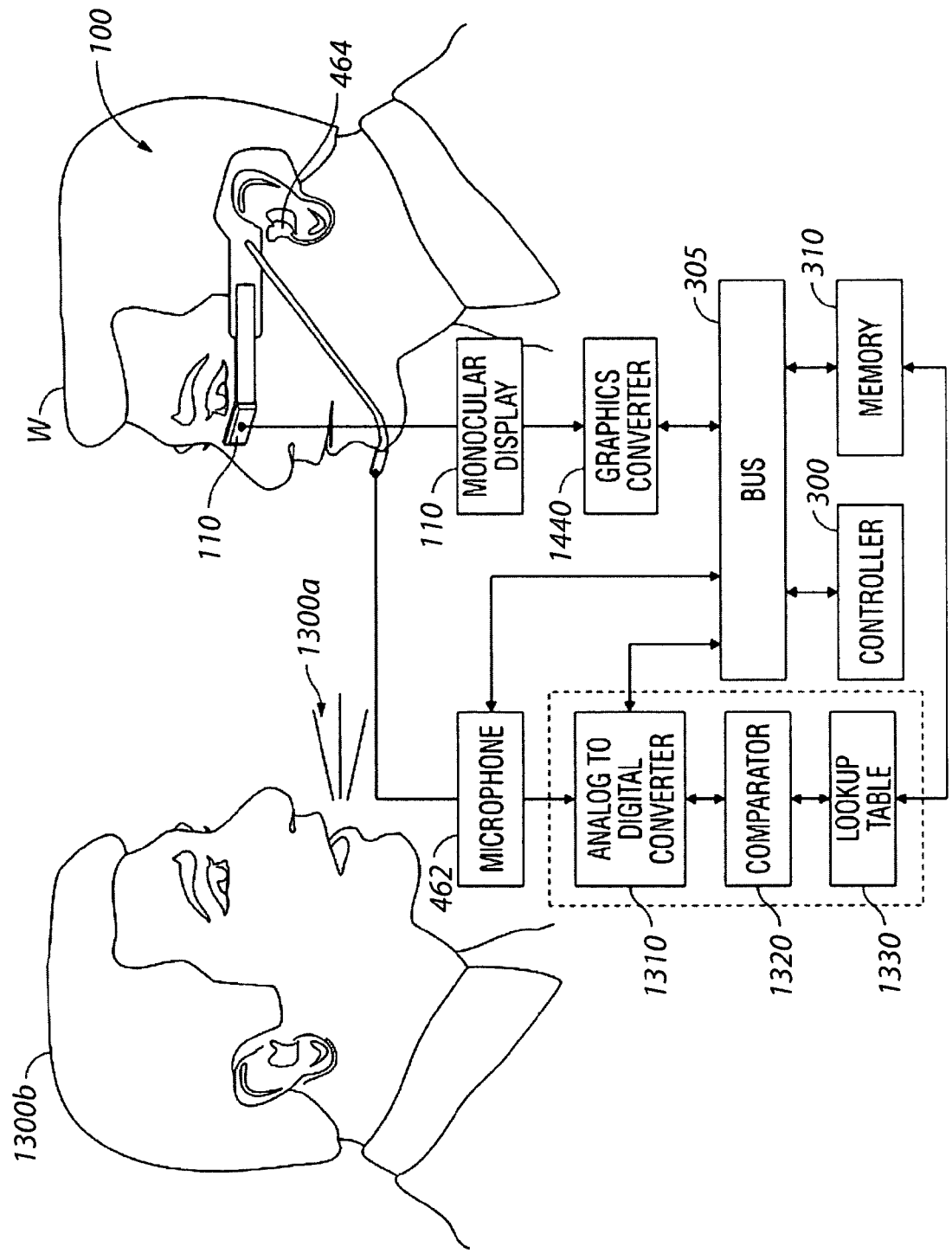

Turning to FIG. 14, in yet another embodiment, the translation may be visually displayed on a display screen 110 of the monocular display device 100. In this aspect, the translation may occur in a similar manner as previously described with regard to FIG. 13. Monocular display device 100 includes a memory 310, and a controller 300 may then compare a received digital file (corresponding to the audio signal 1300a) to the translation lookup table by using the comparator 1320. The controller 300 may convert the digital file using the translation lookup table 1330 to a second digital file corresponding to a translated digital file.

The translated digital file can then be stored in the memory 310. Once instructed by the controller 300, the file can be output from the memory 310, and further be converted by converter 1440 to a suitable digital file that is in the proper video/graphical format to display images to the display 110 of the device 100. Converted digital file is any acceptable format known in the art for displaying images. A clear visual output is displayed to display screen 110, such as, for example, as characters in English, German or Japanese for the viewer's inspection as shown in FIG. 14.

In another embodiment, the translated digital file can then be output from the memory 310 and further converted to a suitable digital file. This file is suitable for both and visual and audio output from the display 110 and speakers 464, respectively. Thus, the user can hear and see the translation of the foreign language in an acceptable translated format and in real time.

Figure 15:
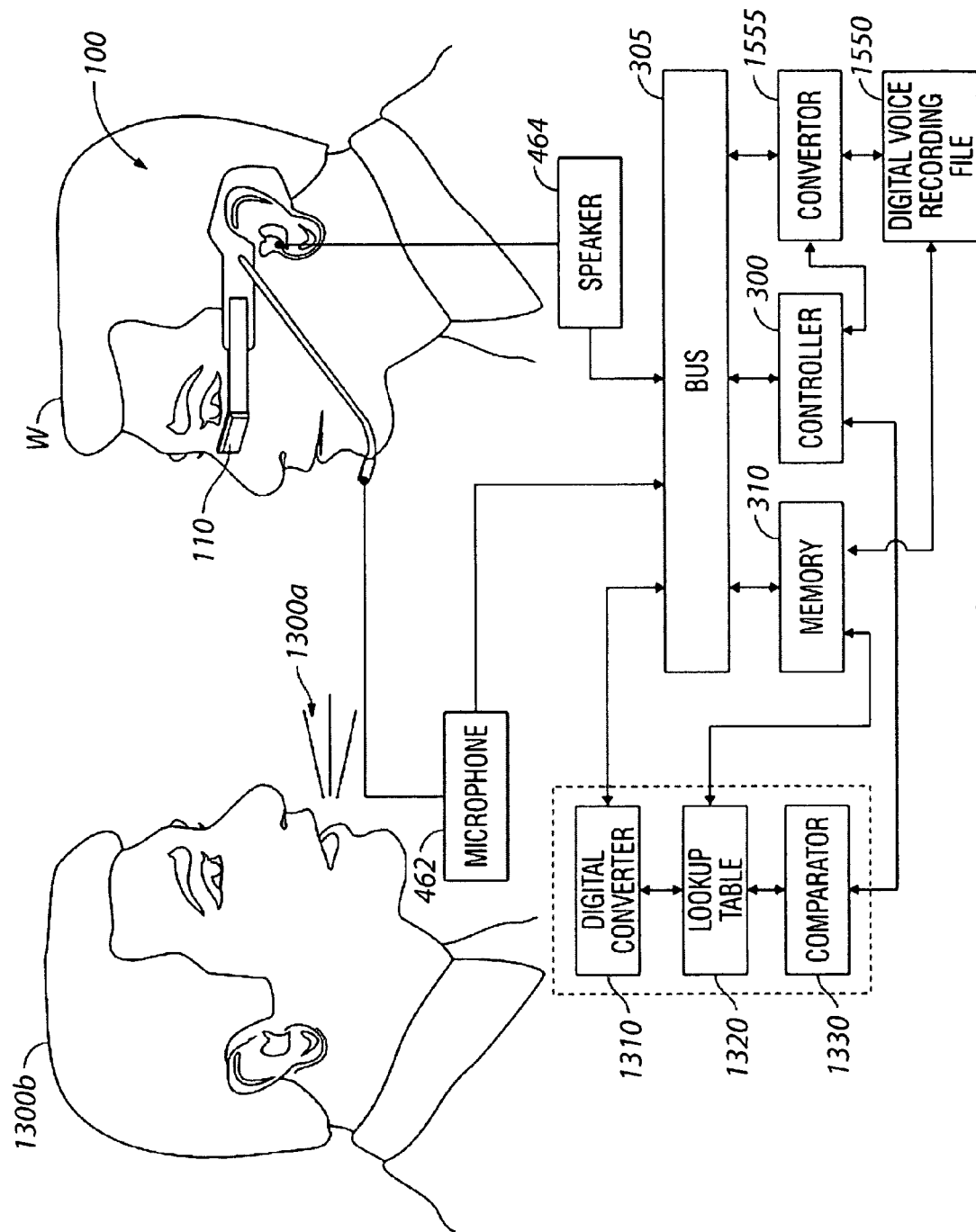

In yet another embodiment shown in FIG. 15, the translation of the speech 1300a of the foreign speaker 1300b can be made in an audio format, but in a specific and aesthetically pleasing recording that is chosen by the wearer in advance. Like with the embodiment shown above of FIG. 13, the monocular display device 100 includes a microphone 462, and a speaker 464, which are operatively connected to a memory 310, and a controller 300 as previously discussed through a peripheral component interface bus 305.

The controller 300 has suitable program instructions to receive the audio signal 1300a from the microphone 462, and to convert the signal 1300a to data at converter 1310. Data is then output to a comparator 1330. The controller 300 further has program instructions to control a comparator 1320. Comparator 1320 compares the digital data output from digital converter 1310 with the language translation lookup table 1330 to convert and translate the digital data to another different language, such as from French to English. The converted data corresponding to the translated language used from table 1330 is then output to a memory 310. The controller 300 may then further convert that translated language data received from the language translation lookup table 1330 to a modulated audio file 1550 of a digital voice recording 1550. This modulated file 1550 can be created using a converter 1555, which may be a set of program instructions executable on the controller 4125 or another digital device including a controller, software and a memory. Converter 1555 is operatively connected to the controller 300, and memory 310.

The data corresponding to the second audio signal is output by the controller 300 from memory 310 to a digital voice recording converter 1555. The digital voice recording converter 1555 changes the digital audio file (that is suitable to be emitted from the speaker 464) to a predetermined recorded voice which speaks the translated text in a simulated manner. In another embodiment, controller 300 may simply convert data from the comparator 1320 into the modulated file 1550, and is not limited to any specific translation software, or translation method.

In one embodiment, the translated speech may be output from the speakers 464 in the simulated voice of a famous individual, famous actor, or pleasant sounding voice such as, for example, a movie star, or professional announcer. In one embodiment an actor, such as, for example, a well known celebrity recorded voice may be output from the speakers 464 in the translated speech from source 1300a in real time. The memory 310 preferably includes data that is in an audio format corresponding to the voice modulation sounds. Various memory recorded voice configurations are possible and within the scope of the present disclosure, and the present device 100 is not limited to any specific recorded voice. It should be appreciated that several recorded voices may be recorded in memory, a male voice, a female voice, an automated voice, or any other possible recorded voice that can be converted using converter 1555. In another embodiment, the device 100 may have more than one recorded voice that are available with each of the recorded voices being preset in memory 310 for later accessibility. During an initial start up or configuration, the desired voice can be selected by the user using an input device or a menu. The digital voice converter 1555 may be able to selectively convert the digital file to one or more different simulated voices simply from a selection using an input device (not shown) and using the display 110.

The present monocular display device 100 is not limited to translating or displaying a translation, and instead may be configured to translate foreign speech to an understandable text in a recognizable language, and then record the translation for future use. The monocular display device 100 can be configured to simply translated speech to text, and record the text in the memory 310 of the monocular display device 100.

In another embodiment, monocular display device 100 can also be configured for use with a mobile telephone (125b of FIG. 1) or other communications device. The monocular display device 100 may include a wireless communication interface and have a transceiver (327 of FIG. 3) to receive data associated with a caller's voice from a mobile phone or other communication device (125 of FIG. 1), instead of the microphone 462. Here, the device 100 may translate the audio signal from a foreign caller into a translated audio file that can be output from the speakers 464 or that can be displayed on the display screen 110 as shown in FIG. 15. Various translation output configurations are possible and within the scope of the present disclosure, and the present monocular display device 100 is not limited to any such face to face configuration.

In another example embodiment, the monocular display device 100 may employ a so called computer program "software persona" or avatar for a head mounted audio/visual wireless communication. An avatar is a representation of a two dimensional character or model that permits interaction between the components of the head mounted audio/visual wireless communication apparatus and the wearer. The "software persona" is data that may form a set of images, and/or sounds that are specific to personalize the head mounted audio/visual wireless communication apparatus to the wearer's interests. In one embodiment, the "software persona" takes the form of a simulated person that is immediately recognized by the wearer. In another embodiment, no video is provided, and the "software persona" may only comprise audio elements, such as audio in a predetermined voice that reads a number of commands or menu options. Using this simulated human interface, the user can control their PDA, mobile phone, desktop computer, or any other remote device having a wireless interface. The simulated human can be a celebrity, an actor, an actress, a famous individual, an infamous individual, a politician, a world leader, or an imaginary character, cartoon, mythical creature, or any other real or imaginary graphical character, or graphical output. In addition, the software persona can receive, and playback messages, forward phone calls, sound alarms, determine availability of the user, prioritize messages, and perform other automated functions.

The "software person" preferably can simulate receiving speech commands from the wearer to simulate control of the head mounted device components. The "software persona" preferably can simulate speaking to the wearer to interact with the wearer. Moreover, the persona or software is impermanent, and the wearer can easily swap the persona for a new "software persona" using a relatively simple automated process operable on the device. In another embodiment, the "software persona" may be a software application that can be purchased for a small fee, or a number of "software personas" can be purchased in a bulk license.

The "software persona" may appear to talk, sing, or otherwise simulate speech, and the wearer can view the persona on a display associated with the head mounted display, such as, by viewing high resolution graphics that are output in the form of a face of a simulated individual or celebrity. Preferably, the "software persona" or simulated human speech and images are aesthetically pleasing to the wearer, and the wearer enjoys the interaction, and interacts with the personalized persona or simulated human images and sound to rapidly and easily control the device. It is envisioned that instead of using an input or output device, the head mounted display has a speech recognition capability and software to receive and process speech commands to further provide control commands to the device, which are in turn used to control one or more peripheral components of the head mounted device. The "software persona" can be stored remotely or locally, and the software can be executed on a processor that is local or remote. In one embodiment, the "software persona" can appear to emulate reading menu options in a celebrity voice, such as, for example, a famous actor.

Figure 16:
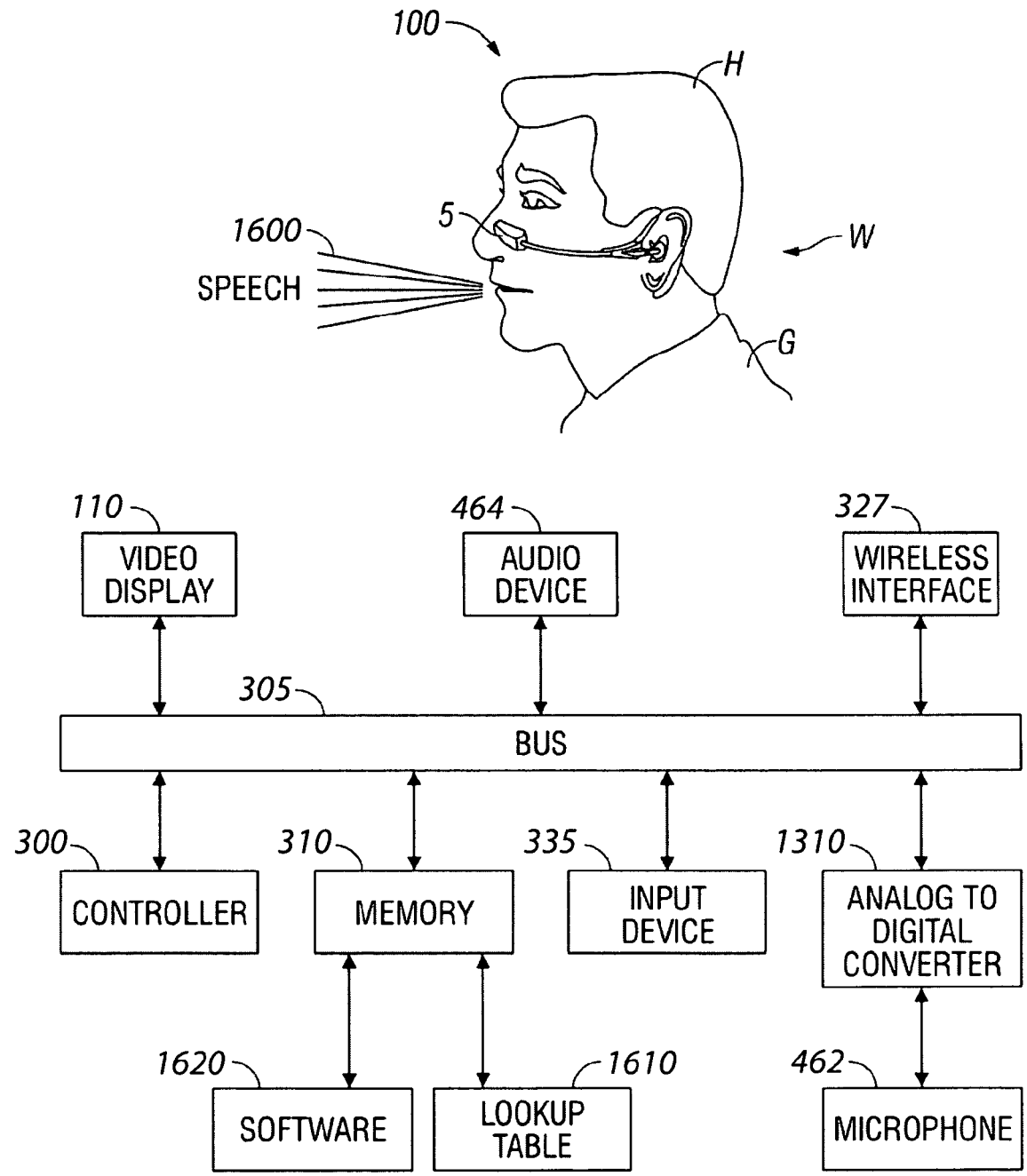
FIG. 16 shows a schematic view of a head mounted wireless communication device that includes a memory for storing program instructions that can provide a simulated video celebrity human interface for interaction with the user with audio and video.

Turning to FIG. 16, there is shown a schematic view of an embodiment of a audio/visual head mounted wireless communication device 100. The audio/visual head mounted wireless communication device 100 is shown as a monocular display device, but it is not limited to this configuration, and may have a different head mounted configuration (such as binocular, etc.) or can be attached to a pair of reading glasses, or sunglasses. The audio/visual head mounted wireless communication device 100 is shown as a general non-limiting computer configuration, but may have other configurations. In one embodiment, the device 100 may have a boom with a connector that snaps on to a hat, or part of sunglasses, etc. The audio/visual head mounted wireless communication device 100 preferably includes a support structure 5 and can be supported in a comfortable manner around the head H of the wearer W, around the ear E of the wearer W, or supported on a garment G that the wearer W is wearing, such as, for example, a hat.

Various monocular device support configurations are possible and within the scope of the present disclosure and some of these configurations are described in detail in U.S. Provisional Patent Application No. 60/880,270 to Jacobsen et al., filed on Jan. 12, 2007; U.S. Provisional Patent Application No. 60/930,232 to Jacobsen et al., filed on May 14, 2007; U.S. Provisional Patent Application No. 60/930,275 to Jacobsen, filed on May 14, 2007; and U.S. Provisional Patent Application No. 60/930,242 to Jacobsen et al., filed on May 15, 2007. All of these patent applications are herein incorporated by reference in their entirety.

FIG. 16 shows a number of components of the audio/visual head mounted wireless communication device 100, and the present device 100 may include different hardware or software components, and is not limited to any specific computer configuration as this is shown for illustration purpose only. The audio/visual head mounted wireless communication device 100 preferably includes a controller 300, a memory 310, such as a minimum 256 megabyte solid state memory, or more, and a bus 305. It should be appreciated that depending on the capabilities of the device 100, the memory 310 may include different amounts (1.5 GB to more than 10 GB) depending on the level of sophistication of the device 100. The present device 100 is not limited to any specific memory amount, and may include a relatively small memory suitable for lookup table functions, or may include more memory depending on the device 100. Each of the components of the computer apparatus 100 are operatively connected to the bus 305 using suitable leads. The audio/visual head mounted wireless communication device 100 preferably also has a display 110, which is operatively connected to the bus 305. The display 110 may have various configurations and can be suitable for VGA or higher resolution, such as high definition television, or for displaying high resolution video images. The display can be any known in the art or as described in the previously cited configurations which are incorporated by reference in their entirety. The controller 300 preferably is a CPU, and is connected to the bus 305. The memory 310 is also connected to the bus 305, and it is envisioned that the memory 310 may include a solid state memory configuration and may further comprise a remote or local hard drive. In one embodiment, the memory 310 may be sufficiently large to hold digital files that supports MP3, MP4, H.263, H.264, WAV, AAC, AIFF, Apple Lossless and Audible 2, 3 and 4 audio files and others.

Preferably, the audio/visual head mounted wireless communication device 100 further includes an audio device 464 with an audio transducer that is connected to the bus 305. Audio device 464 may include an audio transducer element, tweeter, midrange, or base speakers or several sets of speakers, (THK, DOLBY DIGITAL, etc.) and is suitable to emit sound and playback high quality digital files, songs, ring tones, chimes or other audio files in a ready manner from the memory 310. Audio device 464 may further comprise ear buds, or head phones.

The audio/visual head mounted wireless communication device 100 also has a microphone 462, which is operatively connected to the bus 305. The microphone 462 preferably receives speech commands and communicates this data to a digital format using an analog to digital converter 1310. The digital data is then communicated to the bus 305, and the data can be written to the memory 310. The device 100 may further includes an input device 335 such as, for example, a button, a wireless mouse, track ball, a wheel, or a keyboard to select from a number of menu options. However, the input device 335 is optional and the device 100 preferably is controlled using speech recognition commands.

The audio/visual head mounted wireless communication device 100 also includes a wireless interface 327, such as, for example, a wireless radio-frequency transceiver that can transmit and receive wireless radiofrequency signals in a wireless format using Wi-Fi, BLUETOOTH® (e.g., over connection 135 of FIG. 1) or any other wireless format to transmit and receive digital information to, and from, a remote device or to, and from, a network. Interface 327 is suitable for 802.11b/g/n, Wi-Fi, and Bluetooth 1.1, 1.2, 1.5, 2.0 Enhanced data rate, and 3.0 wireless capabilities, however the interface 327 is not limited to these, and depending on the geographic location interface 327 may include other wireless formats as described in U.S. Provisional Patent Application No. 60/880,270 to Jacobsen et al., filed on Jan. 12, 2007; U.S. Provisional Patent Application No. 60/930,232 to Jacobsen et al., filed on May 14, 2007; U.S. Provisional Patent Application No. 60/930,275 to Jacobsen, filed on May 14, 2007; and U.S. Provisional Patent Application No. 60/930,242 to Jacobsen et al., filed on May 15, 2007.

Preferably, the audio/visual head mounted wireless communication device 100 is controlled using speech recognition technology such as, for example, NUANCE® speech recognition software from Burlington, Mass. In operation, speech commands 1600 from the wearer W are received by the microphone 462 in an analog format. The analog data is converted to digital data using analog to digital converter 1310. The digital data is routed through the bus 305 and stored on the memory 310 for access. Controller 300 includes program instructions to access this memory 310 and convert the data received by the microphone 462 into control commands using a lookup table 1610 stored in memory 310, or stored outside of memory, or even outside of the device 100 by using the wireless interface 327 to communicate with a remote memory (e.g., in remote device 125 of FIG. 1). The control commands may be output to run a software application recorded in the memory 310 to open an e-mail, watch a movie, etc. Various software operating systems are known in the art to control various peripheral devices, such as MICROSOFT® MOBILE, MICROSOFT® WINDOWS VISTA® operating system, SYMBIAN®, APPLE OSX®, LINUX® or any other known in the art. In one embodiment, the look up table 1610 may be associated with a speech recognition software program, such as, for example, NUANCE DRAGON NATURALLY SPEAKING 9.0®, or any other suitable speech recognition software program.

Preferably, the audio/visual head mounted wireless communication device 100 includes a software program 1620 that provides an aesthetically pleasing video and/or "audio persona" or simulated human attributes to the audio/visual head mounted wireless communication device 100. These attributes can be in the form of images, such as, for example, a simulated human face displayed on the display 110, or in the form of audio, such as, for example, a simulated, modulated, or recorded voice that is emitted from the audio device 464. The present audio/visual head mounted wireless communication device 100 is also not limited to a simulated human appearance or simulated human voice, and the software program 1620 preferably can provide other pleasing stimulus to the user, such as music recordings or pleasing pictures that form a pleasing theme in addition to the "persona". The software program 1620 may also provide an "artificial persona" or theme during interaction. This provides a highly personalized and pleasing experience to the user, and the user enjoys using the audio/visual head mounted wireless communication device 100.

In an embodiment of the present disclosure, the audio/visual head mounted wireless communication device 100 preferably provides an audio persona and not a video persona. In this regard, the audio/visual head mounted wireless communication device 100 includes a software program 1620 that modulates the audio of the device emitted from one or more transducers (not shown) of the audio device 464. Preferably, the audio persona 1620 provides an aesthetically pleasing voice modulated recording when outputting one or more menu options from the audio device 464. This aesthetically pleasing voice modulated recording can read a number of menu options to the user for a user to select using an input device or to select by using speech recognized voice commands.

For example, the audio/visual head mounted wireless communication device 100 may output a recording stored in memory 310 to output a number of voice commands, such as "To Open E-Mail, Say E-Mail, To Make a Call, Say Telephone, To Watch Video, Say Watch Video," etc. Using this simulated human interface, the user can control their PDA, mobile phone, desktop computer, or any other device having a wireless interface (e.g., device 125 of FIG. 1), and the menu options may change depending on what other surrounding devices are present. All of these menu options may be output in a specific prerecorded celebrity voice, and customized by the user without video. This specific prerecorded voice or sound may have a predetermined timber, timing, and sound of an actor, actress, accent, or other desirable entity, such as an authoritative or pleasing speech pattern. Moreover, these recordings that appear to read a number of menu options may be installed, swapped, and replaced by the user in an easy manner for a slight fee using a wireless interface 327, and suitable computer program. Preferably, the audio/visual head mounted wireless communication device 100 can include an integrated chip for this purpose.

In another embodiment of the present disclosure, the audio/visual head mounted wireless communication device 100 preferably provides a persona that includes audio elements and video elements, and may include multimedia. In this regard, the device 100 includes a software program 1620 that modulates the audio of the device emitted from one or more transducers (not shown) of the audio device 464, and also displays images on the video display 110. Preferably, the audio and video persona provides an aesthetically pleasing voice modulated recording and video when outputting one or more menu options from the audio device 464 and video display 110 to emulate interaction with the user of the audio/visual head mounted wireless communication device 100. This aesthetically pleasing, voice modulated, audio, digital recording and video can simulate the look and feel of an individual reading a number of menu options to the user with the user being able to see and hear the video persona. This can promote the user emulating speech with the persona using both video and audio for a user to control the device by using speech recognized voice commands, or an optional input device 335. Using this simulated human interface, the user can control their PDA, mobile phone, desktop computer, or any other device having a wireless interface by speaking speech commands into the microphone 462 and emulating speech with the displayed persona.

Additionally, the software persona 1620 may include program instructions to act as a digital assistant when associated with a mobile phone or other communication devices, such as SKYPE® peer to peer communication devices, mobile phone, e-mail device, PDA etc., as shown in FIGS. 21-27. In one embodiment, the user may receive a phone call from a mobile device, such as a cell phone or PDA, Smartphone. The audio/visual head mounted wireless communication device 100 can pick up the call so the call can be answered using the audio/visual head mounted wireless communication device 100 instead of by picking up the phone over Bluetooth, or a similar radio frequency connection. In this regard, the wearer may be busy performing other functions, such as checking e-mail, or engaging in word processing using a keyboard input device 335. Here, the persona software program 1620 may provide the caller with a pleasing audio or video image with a number of menu prompts for the caller to select in the wearer's absence. (i.e., to leave a message, to wait, etc.) Additionally, the prerecorded messages may appear substantially life-like, and can be swapped and be different for different callers, and the user can purchase different software persona 1620 for this purpose.

In yet another embodiment, the software persona 1620 may include a computational intelligence program that allows the controller 300 to provide formal analysis and/or statistical analysis from the received input of the user and output reasoned conclusions in the form of video from the video display 110, and/or audio from the audio device 464. In one embodiment, the "software persona" 1620 may include a neural network or other artificial intelligence program. Given that the memory 310 may include limitations based on the mobile nature of audio/visual head mounted wireless communication device 100, the computational intelligence program 1620 may operate in various ways. The program 1620 can be stored locally on memory 310, or stored on a remote system (e.g., device 125 of FIG. 1), and the program 1620 can be licensed, purchased, rented, etc. Alternatively, the program 1620 can be stored on a network, and run on the remote network with an output of the network being wirelessly communicated to the audio/visual head mounted wireless communication device 100 using a wireless interface 327. Still further, the computational intelligence program may be run on a background of the audio/visual head mounted wireless communication device 100.

Figure 17:
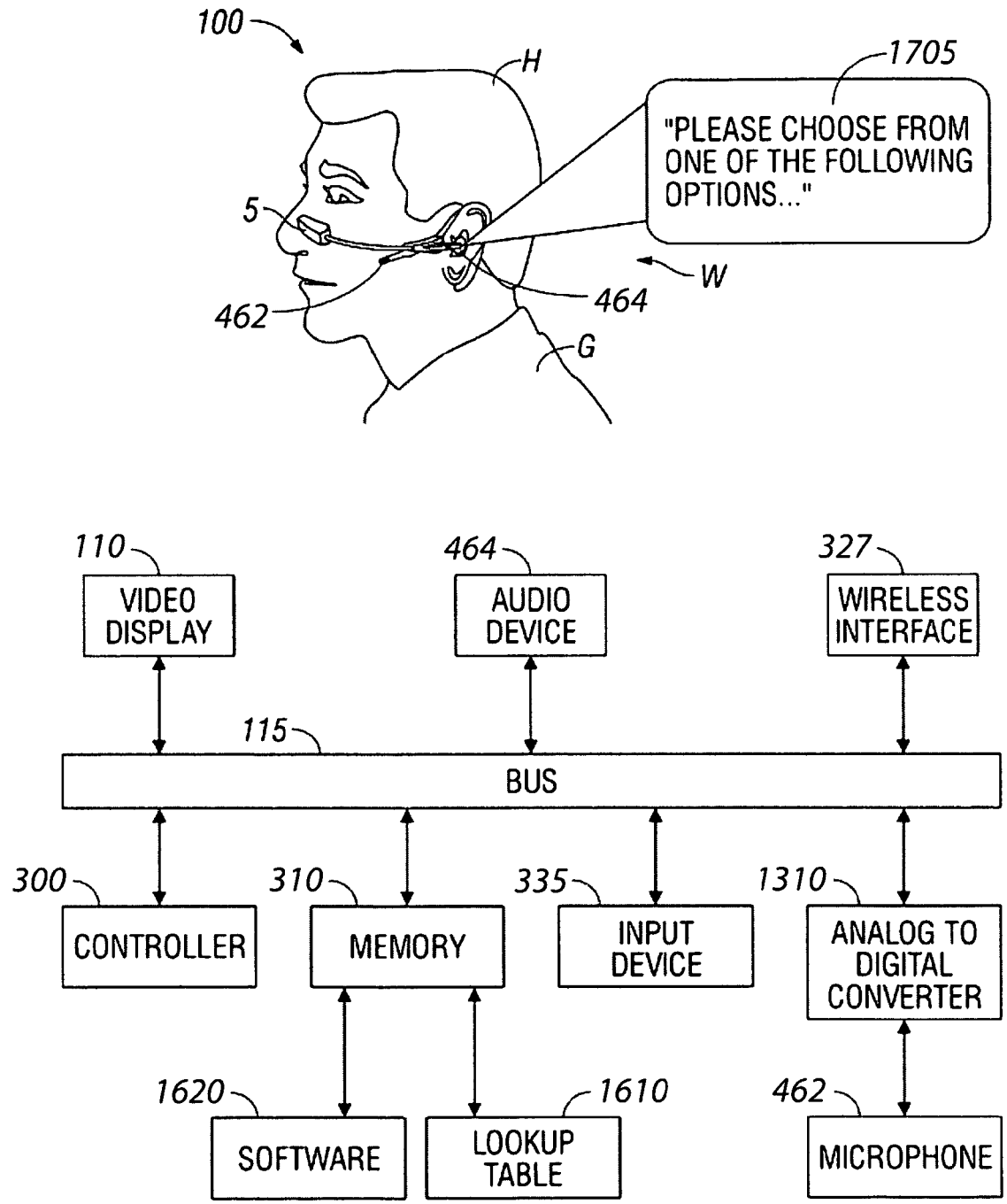
FIG. 17 shows a schematic view of the audio/visual head mounted wireless communication device having audio output.
Figure 18:
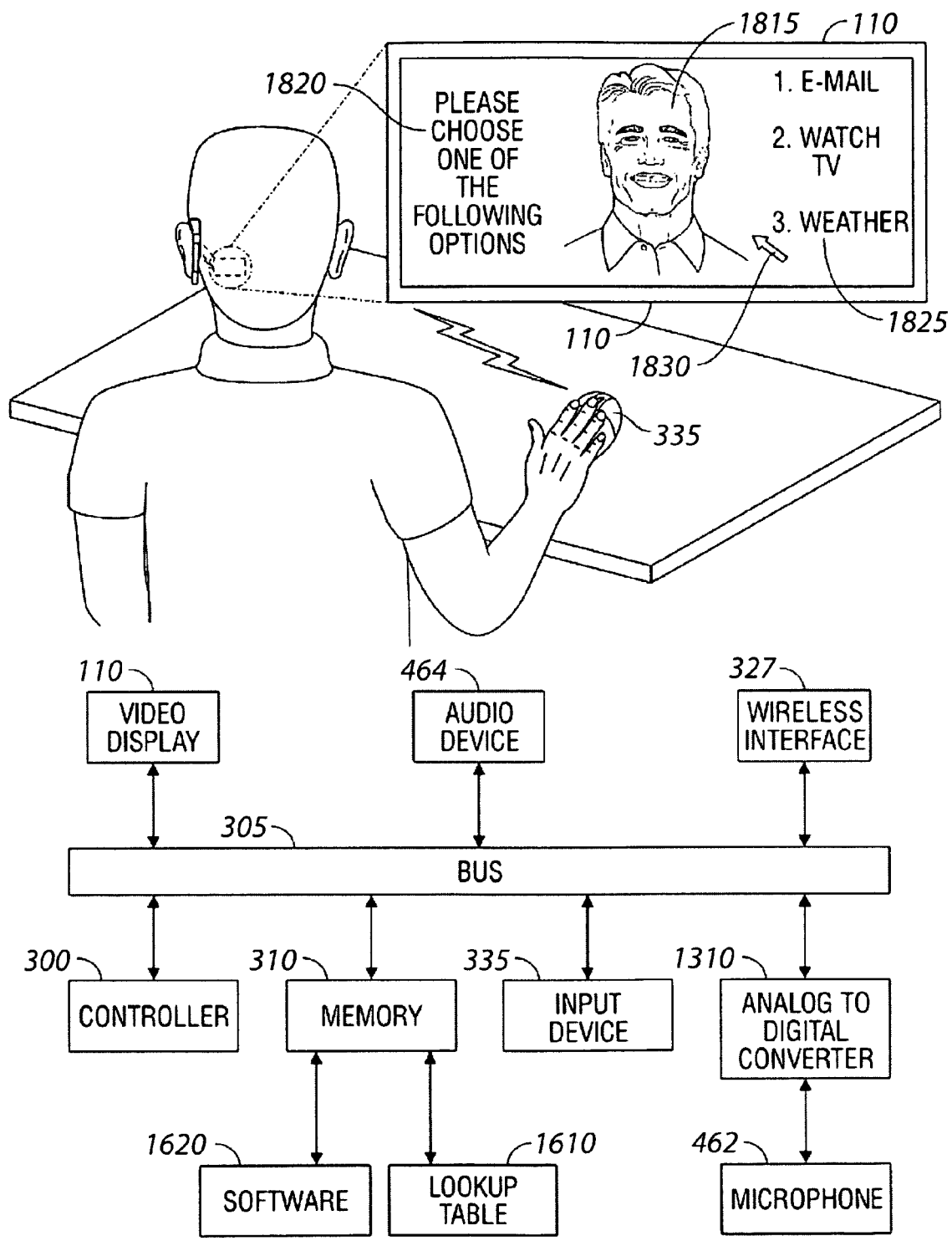
FIG. 18 shows a view of a display that shows an image that includes a simulated recognizable aesthetically pleasing human face and that shows a number of menu options for control of the audio/visual head mounted wireless communication device using an input device.

Turning now to FIGS. 17-18, there is shown one embodiment of the audio/visual head mounted wireless communication device 100 having a specific "persona" that originates using the software program 1620 stored in the memory 310. In this embodiment, the device 100 interact with the user using audio that is output from an audio device 464 and that is supported by the housing 5 of the device 100. Here, the controller 300 may execute the specific software program 1620 in the memory 310, and the software program 1620 may include digital audio files that simulate reading a menu choice of options 1705 to the wearer W. However, the software program 1620 may include program instructions so that the audio is read in a predetermined recorded speech or personalized tune 1705 that is aesthetically pleasing to the wearer W.

In one embodiment, the predetermined recorded speech 1705 is a simulated speech of a celebrity or famous individual's voice, such as an actor, SYLVESTER STALLONE, a cartoon character, a likeness, an imaginary or real character or historical figure, such as, for example, a former President of the United States, etc. In one non-limiting embodiment, the speech 1705 may read a menu of options 1705 for the user to select by engaging the input device 335, or by receiving the appropriate speech command received by the microphone 462. Preferably, the "software persona" 1620 stored in the memory 310 will include one or more digital files that support MP3, or WAV, or another format. The audio files are preferably associated with a famous individual's voice. Recordings are transmitted from the audio device 464 at the correct interval selected by the controller 300. For example, the famous individual software, character, or avatar may emit simulated speech that includes "Select from the following options: To open an e-mail application, say 'e-mail'", To listen to music, say "music", to watch a movie, say 'movie'", and so on in the desired recorded voice. Other menu options are envisioned, and this forms no limitations to the present disclosure.

Turning now to FIG. 18, there is shown another example of a "software persona" shown in an enlarged view for illustration purposes separate from the display 110. In this embodiment, the audio/visual head mounted wireless communication device 100 also interacts with the user using video that is displayed using high resolution graphics from the video display 110 and that is displayed on the housing 5 of the audio/visual head mounted wireless communication device 100. Here, the controller 300 may run the software program 1620 in the memory 310, and the software program 1620 may include data files that are associated with video. The video 110 displays a simulated human image 1815 that appears to the wearer W, and which is output on the display (showing an enlarged view of the display 110) and which is in the peripheral view of the wearer and does not block the wearer's normal viewing space.

Software program 1620 includes program instructions so that a displayed video image is in the form that is in an aesthetically pleasing, personalized, celebrity, character. The character 1815 is graphically output to the wearer. In one embodiment, the predetermined image is a simulated face that is specifically chosen by the wearer of a celebrity or famous individual's likeness (such as an actor, or actress, such as MARILYN MONROE or any other real or imaginary individual or cartoon known in the art). It should be appreciated that countless different actors or likenesses may be used. The specific actor, actress or famous individual is arbitrary and personalized depending on the wearer W, the image can be any simulated aesthetically pleasing image promoting simulated interaction with wearer. In another embodiment, plural actors or likenesses may be used depending on the specific task.

In one non-limiting embodiment, the video graphics that are displayed may further include an instruction 1820, a number of menu of options 1825, and a cursor 1730. The user may select by clicking using the input device 335 (e.g., a wireless mouse), or by receiving the appropriate speech command received by the microphone 462. Preferably, the famous individuals likeness 1815 is displayed at the correct interval selected by the controller 300. For example, the famous individual 1815 may show a face, or portion thereof, or an entire simulated person. Along with the likeness of an individual 1815 (such as an actor, celebrity, or famous/infamous person, cartoon, or likeness) there may be displayed text instructions 1820 "Select from the following options" instead of the image simulating reading the instructions. Other instructions are also envisioned. This permits the user to be prompted to select a control command using the input device 335, such as a wireless mouse. Icons for control or Hyperlinks may also be displayed that include "Open an e-mail application," "Watch television," and "Obtain weather," etc. In yet another embodiment, the audio/visual head mounted wireless communication device 100 may include both video and audio attributes for a "simulated persona," and the simulated persona 1815 may appear to read the options to the wearer, instead of displaying the options 1825. Preferably the persona 1815 may be a part of an automated system that prompts the user with notices, an alarm, a warning, or any other indication of interest to the wearer.

Preferably, persona 1815 can allow the wearer to leave a voice message for themselves and for later playback. Additionally the avatar 1815 can leave a message that is prerecorded for an outside caller, or can provide a system wide message separate from a computer. Preferably, the audio/visual head mounted wireless communication device 100 provides a resident synchronizing signal to a remote computing device or cell phone to link up to a remote device as needed. Preferably during holding, the caller may receive video messages that are entertaining. Preferably, the video messages can be a short commercial or animation clip, and can be purchased and sold in a mobile manner from a distributor or similar third party. In another embodiment the video message can include an advertisement or promotion that is sponsored by a third party, an advertiser may pay a fee to display their ad during the caller's holding on a mobile device or Smartphone. Here, the advertisement can be selectively played during holding by an advertising third party for a cost. Alternatively, the avatar 1815 can receive input information from the caller to delivery to the individual associated with the audio/visual head mounted wireless communication device 100.

Figure 19:
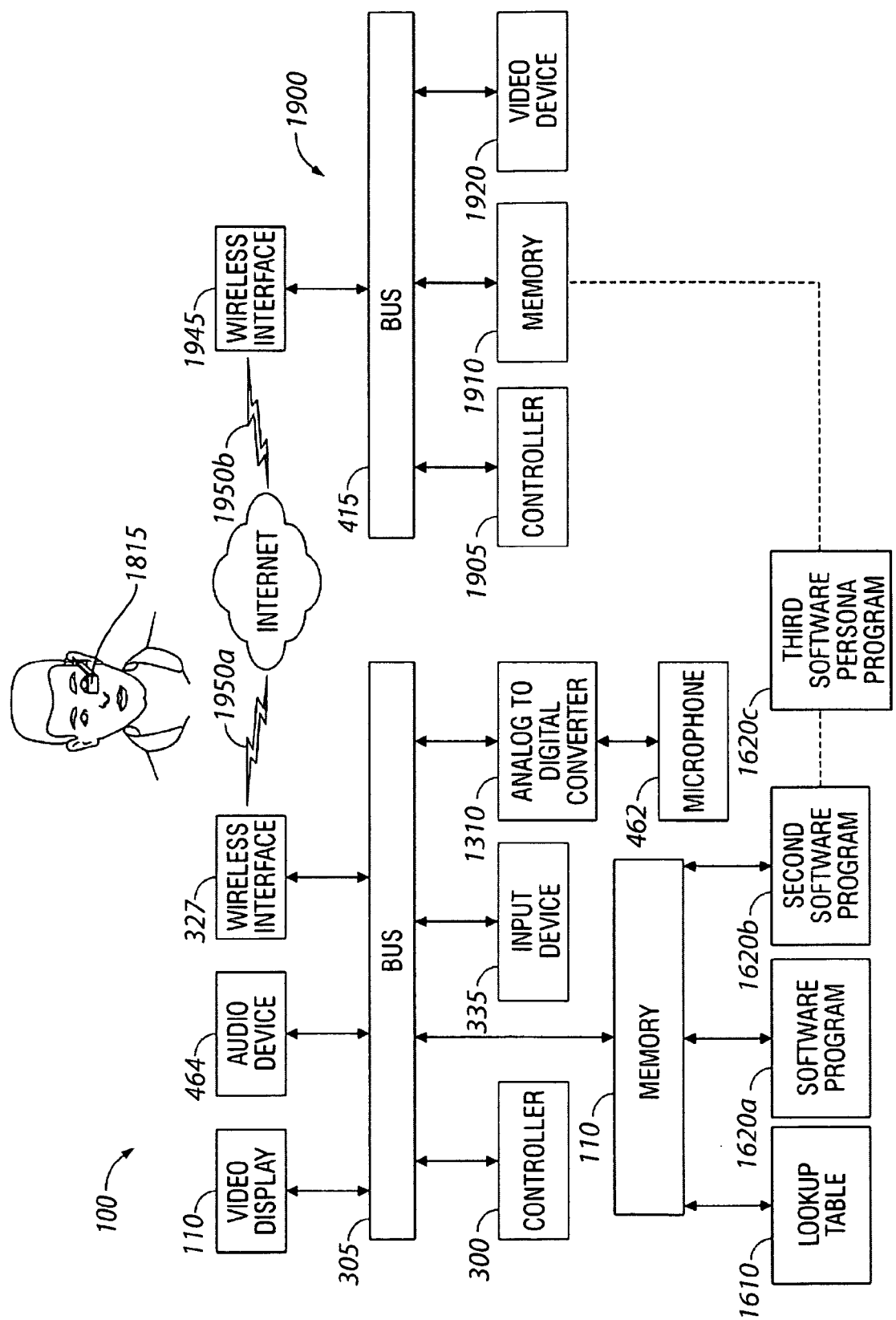
FIG. 19 shows a schematic view of an audio/visual head mounted wireless communication device with a wireless interface for obtaining a new software program for a new "software persona" for interaction with the user.

Turning now to FIG. 19, there is shown another embodiment of the present device 100. In this embodiment, the audio/visual head mounted wireless communication device 100 can preferably communicate with remote computing device(s) 1900 in order to obtain a different "software persona" 1620*a*, 1620*b*, 1620*c*, etc. Additionally, the audio/visual head mounted wireless communication device 100 can communicate with a second device, a network, the Internet, or an internal network, or a public venue network. The wearer may provide a control signal to the wireless interface 1945 of audio/visual head mounted wireless communication device 100 to transmit a radiofrequency signal 1950*a* to a second wireless interface 1945 or to the Internet. The control signal 1950*a*, 1950*b* is suitable to create a bi-directional communication link between the audio/visual head mounted wireless communication device 100 and another second device 1900 or to the Internet. The wearer using a set of menu commands can obtain a second personalized "software persona" 1620*b* from the Internet or from a remote computing device 1900, such as a server, or other computing device having a memory 1910. The wearer may choose an avatar or two dimensional image from a number of choices, or simply type in the name of a famous individual or select an audio persona from a number of choices. The wearer can control the wireless interface 1945 using persona character 1815 to receive radiofrequency signals from the wireless radiofrequency link 1950*b* and write the software program 1920*b* to the memory 310 originating from remote memory 1910.

In this manner, the wearer, using the input device or speech recognition, can select a new two dimensional "persona" or avatar 1620*b* for interaction that is different than the first "software persona" program 1620*a*. The second "software persona" 1620*b* can be stored and the first "software persona" 1620*a* can be erased. Likewise, for a fee payable to a third party subscriber, a second persona program can be replaced with a third "software persona" program 1620*b*, 1620*c*, etc. It should be appreciated that some avatars 1815, which are desirable, and depending on popularity, may be more expensive than others.

In yet another embodiment, memory 310 may include multiple mixed "software persona" two dimensional avatar programs, such as a first actor image 1815, a second different celebrity voice, and a third cartoon or animated graphic forming the body. In this embodiment, using the wireless interface 327, the user may use the input device 335 to control the controller 330 to provide control instructions to install a program associated with multiple or mixed "software personas," which are different than the installed or first "software persona" programs 1620*a*. Preferably, the wireless interface 327 communicates over a high data rate in order to wirelessly receive large video files, and audio files in a mobile wireless environment.

Figure 20:
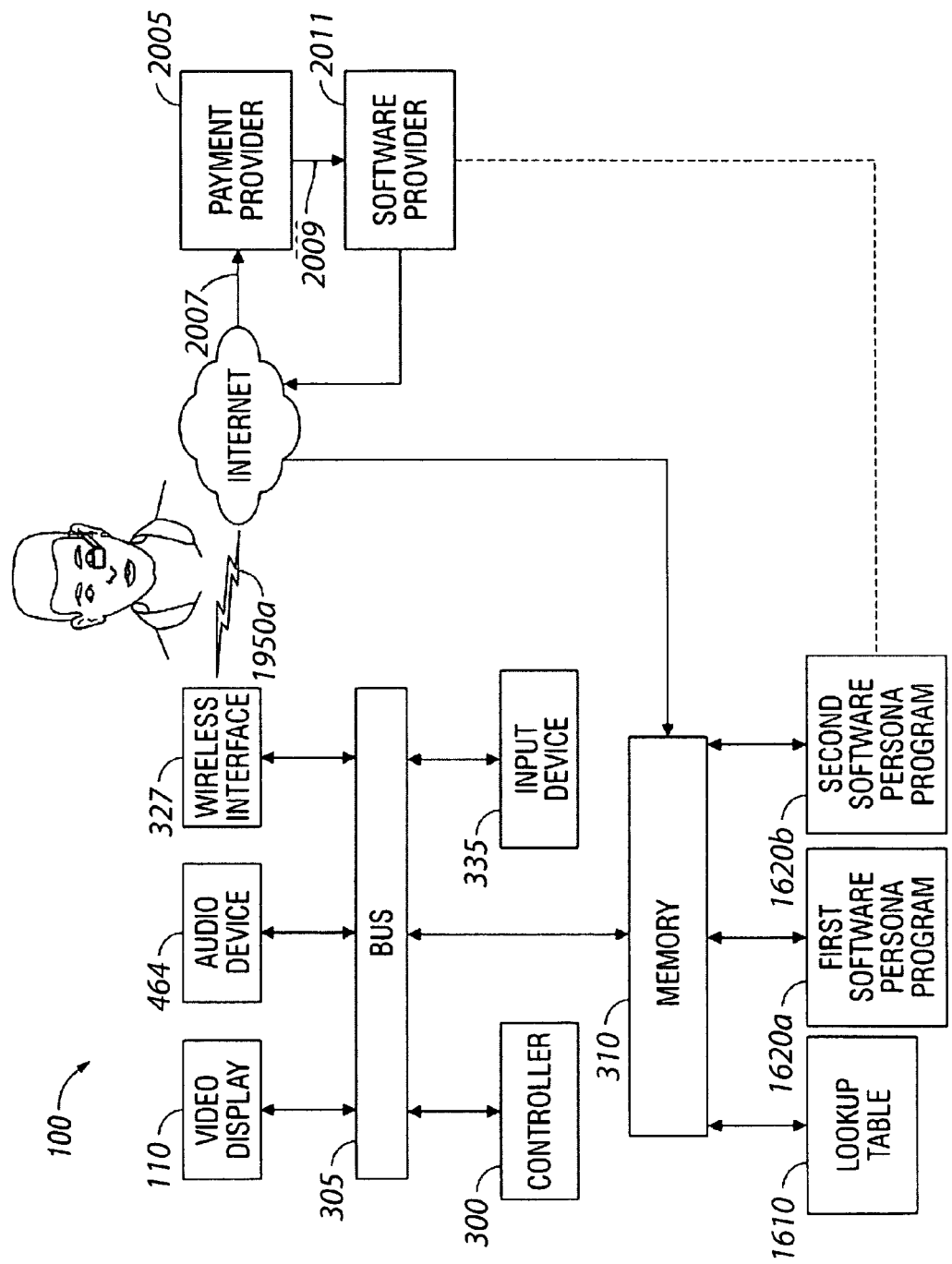
FIG. 20 shows a schematic view of a head mounted display with a wireless interface for purchasing a new software program from a software provider for a fee payable to a payment provider.

Turning to FIG. 20, there is shown yet another embodiment of the present disclosure. In this embodiment, the audio/visual head mounted wireless communication device 100 may be used as a platform for the purchase and sale of additional software programs that are associated with a second "software persona" 1620*b* for user interaction with the audio/visual head mounted wireless communication device 100. In this embodiment, the audio/visual head mounted wireless communication device 100 is configured to be able to swap, replace, or augment the "software persona" program 1620*a* with a new "software persona" 1620*b* for a fee in a business e-commerce transaction. The audio/visual head mounted wireless communication device 100 can preferably communicate with remote computing device(s) (not shown) or the Internet along a link 1950*a* in order to obtain the different or second "software persona" 1620*b*. Second persona 1620*b* may be associated with a digital file that can be transmitted and received using a wireless modem, a wired or wireless interface, or that can be stored on a recordable medium, such as, for example, a compact disk or removable flash memory.

The wearer may select an Icon running on the operating system that is associated with the audio/visual head mounted wireless communication device 100 or otherwise provide a control signal to the wireless interface 327 to obtain the second software program 1620*b*. The wearer using the input device 335 may also input data associated with payment information, which can be encrypted and delivered to a payment provider 2005 along line 2007. The controller 300 will then control the wireless interface 327 to transmit a radiofrequency signal 1950*a* to a second wireless interface (not shown) or to the Internet to obtain the second desired software program 1620*b* associated with the second "software persona". The control signal along path 1950*a* is suitable to create a bi-directional communication link between the audio/visual head mounted wireless communication device 100 and another second device (not shown) or to the Internet. The data associated with the payment information may be routed through the Internet to the payment provider 2005 to verify payment. Once the payment is verified along line 2009 to provider 2005, information is sent to the software provider 2011 to permit delivery of the software program 1620*b* along link 1950*a* from the software provider 2011 to the memory 310 of the audio/visual head mounted wireless communication device 100. The present apparatus 100 is envisioned to encompass peer to peer transactions and peer to peer communication networks such as SKYPE®, etc. Audio/visual head mounted wireless communication device 100 may be configured to buy, sell, or swap two dimensional avatars with another monocular device using wireless interface 327, and a payment provider or service, such as, for example, PAY PAL®, remote banking, e-banking accounts.

Figure 21:
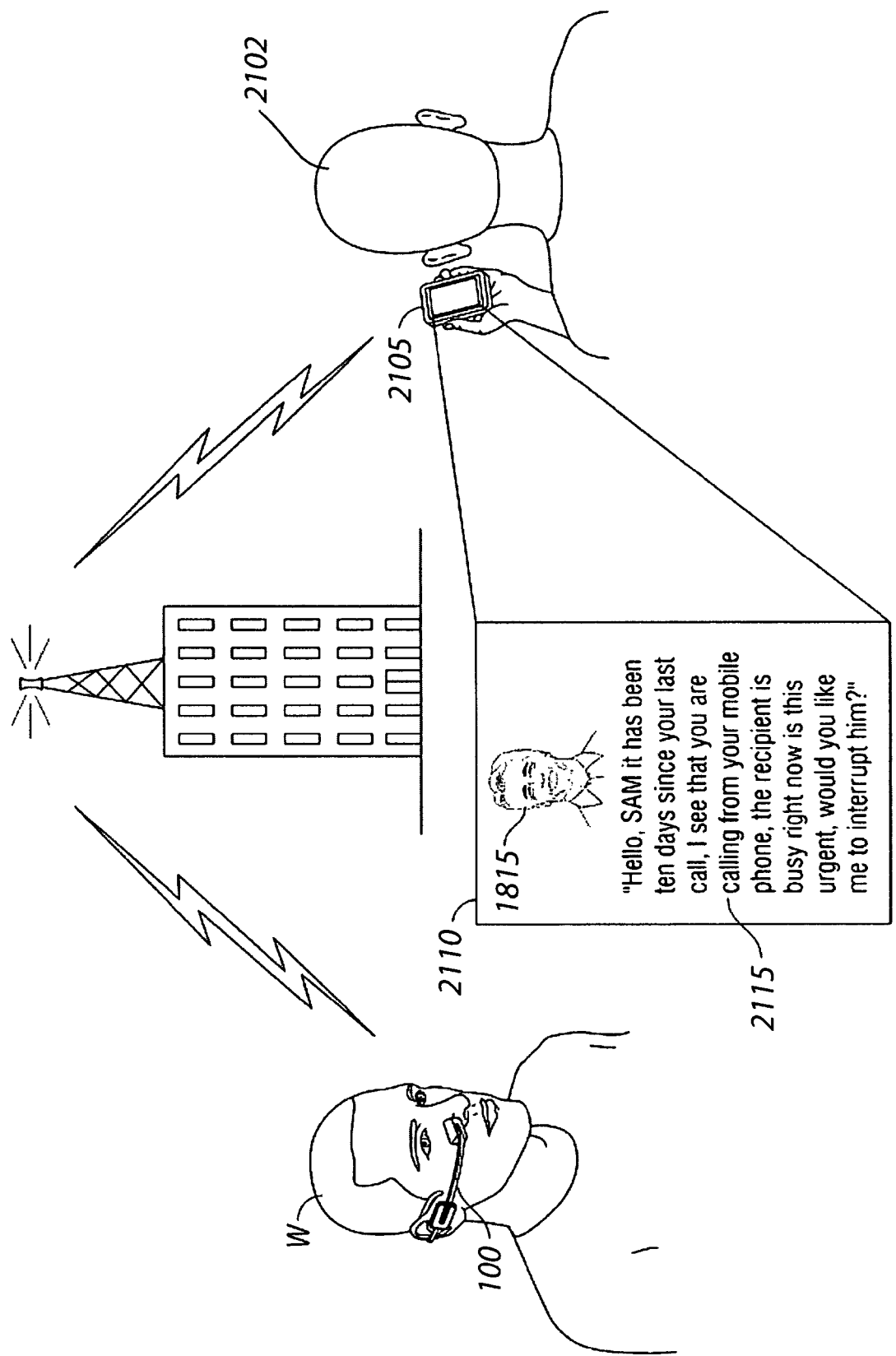
FIGS. 21-27 shows the wireless virtual persona acting as an assistant for receiving an incoming call, and that can place callers on hold for the wearer of the monocular communications device while playing an advertisement for the benefit of the caller on a mobile device.

Turning now to FIG. 21, there is shown another embodiment of the present disclosure. Here the wireless interface (e.g., interface 327 of FIG. 18) of the communication device 100 links with a remote communication device, such as, a cellular telephone (not shown) (e.g., device 125 of FIG. 1) by Bluetooth communication protocol (Bluetooth 137 over link 135 of FIG. 1). The wearer W can use the head mounted audio/visual wireless communications device 100 to call or to receive a call from an individual 2102 using a Smartphone 2105, PDA, or cell phone or other computing device located some distance away. Preferably, in this embodiment, the persona 1815 acts as an assistant and as an intermediary between the wearer W and the caller.

Persona 1815 preferably includes program instructions to answer a phone call; however, since the wearer W is, in this example embodiment, not available, the avatar 1815 may offer the caller 2102 a number of options as the intermediary as shown by reference numeral 2115 on the enlarged display 2110 of Smartphone 2105. The avatar 1815 may offer to (i)

place the caller on hold, (ii) play a short video for the caller while the caller waits on the caller's device, (iii) request that the caller leave a message, or (iv) may make a different determination. Preferably, the apparatus 100 includes computational intelligence to perform these tasks.

Additionally, the avatar 1815 may gather data and include one or more prerecorded greetings with specific data about the wearer W or caller. Using caller identification data, the avatar 1815 may appear to emulate knowing the caller, and may insert a specific caller's name and the time elapsed since the caller's last phone call into a prerecorded message. For example, the avatar 1815 may initially respond to a caller as follows, "Hello Bob, it has been 3 weeks, and four days since your last call" and thereafter may state "Let me see if the recipient is available." If available, the avatar 1815 will emulate putting the telephone call, e-mail, or instant message through to the wearer W, and if the wearer W is not available, then avatar 1815 may respond with a query, such as, "Is this call urgent? Please speak yes or no.". Alternatively, the avatar 1815 may solicit inputs from a caller's mobile device keypad.

Turning now to FIG. 21, the avatar 1815 may offer the caller with a number of choices 2120. Choices 2120 can include (i) to send the wearer W a short message to determine availably, (ii) to send the wearer W a message that the caller's call is urgent, (iii) to send a message to the wearer W that the call is not urgent, or (iv) to provide a number of return communication options so the wearer W can return the call to the caller. Other choices 2120 are also envisioned.

Figure 22:
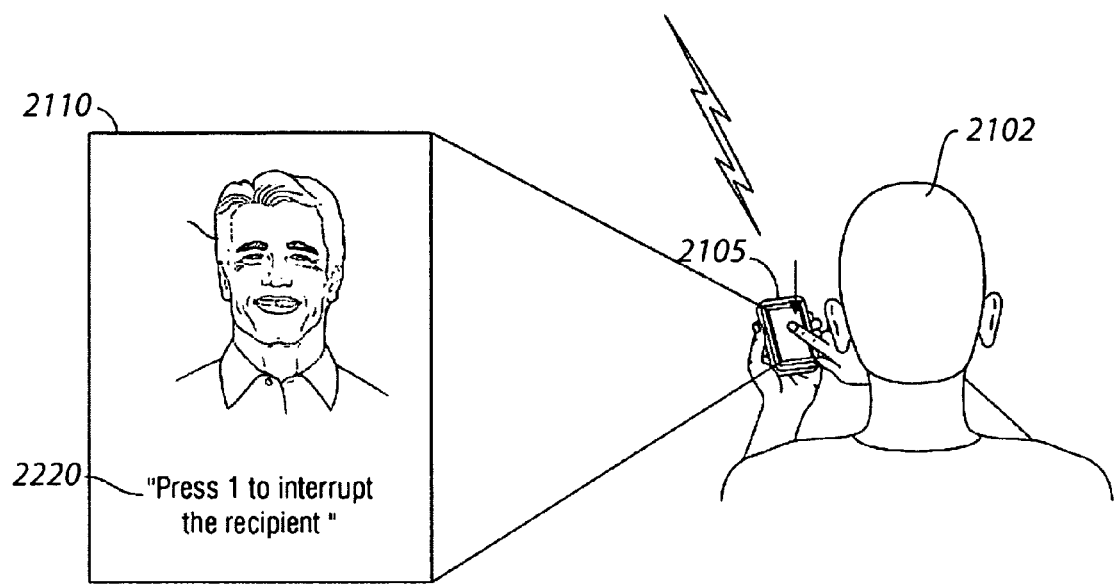

For example, the wearer W may input information to the communication device 100 that certain calls are immediately permitted to go through while other calls are not permitted, and instead are to receive a message from the avatar 1815, or video/audio/text message as shown below with reference to FIG. 22. The avatar 1815 can also prompt the caller 2102 to watch a video message or advertisement/commercial on the Smartphone 2105 for benefit of the caller 2108 during holding or for the wearer's financial gain. The avatar 1815 can further receive input information of contact information as to where the caller can be reached by e-mail, by phone and the phone number, or e-mail address as shown below with reference to FIG. 27, or that the call is urgent can cannot be placed on hold.

Additionally, the avatar 1815 can respond to incoming calls, to confirm appointments with the caller, or propose additional call times, or simply communicate availability. As shown on display 2110 of Smartphone 2105, the avatar 1815 may receive input from a caller to interrupt the wearer W, and in this non-limiting embodiment, the avatar 1815 may instruct the caller to dial 1 to interrupt as shown by reference number 2220. Other commands are also envisioned.

Figure 23:
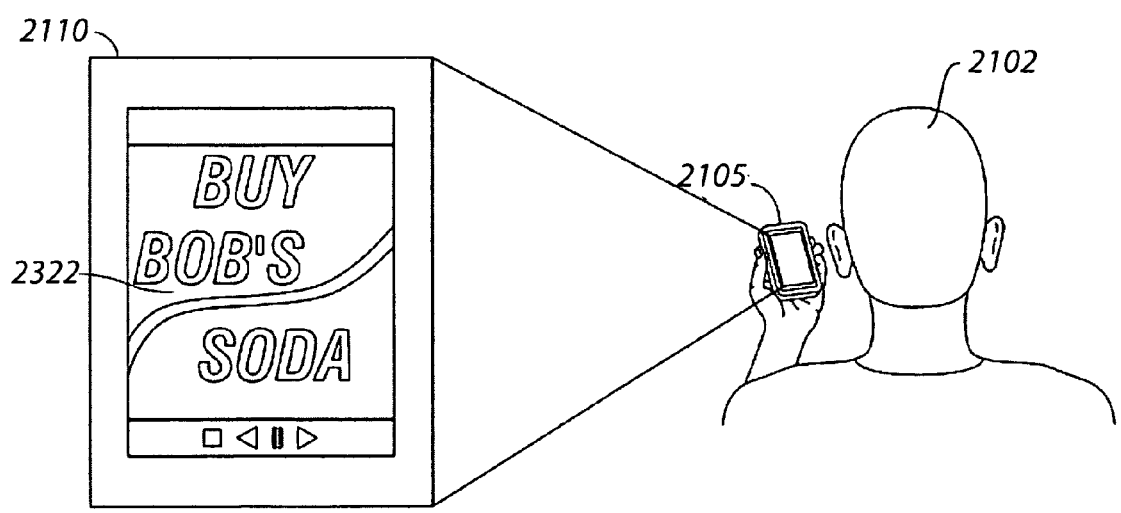

While the avatar 1815 proceeds to interrupt the recipient W as shown in FIG. 23, the avatar 1815 may display an advertisement 2322, or short movie 2322 on display 2110 of Smartphone 2105 for the benefit of the caller 2102. This may be an amusing ad 2322, which is personalized by the wearer W. Moreover, the wearer W may be paid (by a third party sponsor or advertiser) to display such an ad 2322 from the third party. Alternatively, the wearer W may load favorite songs, movie clips or other messages. Various media configurations are possible and within the scope of the present disclosure.

Figure 24:
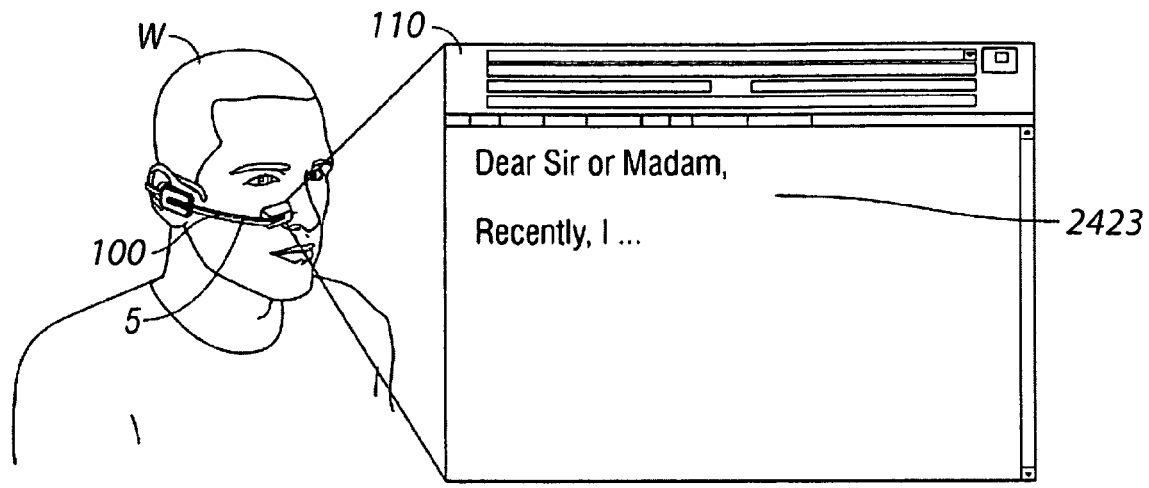

Turning now to FIG. 24, since the device 100 is multifunctional, the wearer W may be using an input device, such as a keyboard (not shown) to prepare a letter using a word processing program application 2423 that is run on a remote processor (not shown) and displayed on the video display 110. As can be appreciated, the avatar 1815 is minimized and not shown when the wearer W is working on business software applications, such as, a word processor 2423, spreadsheet, etc. Alternatively, the device 100 may be off.

Figure 25:
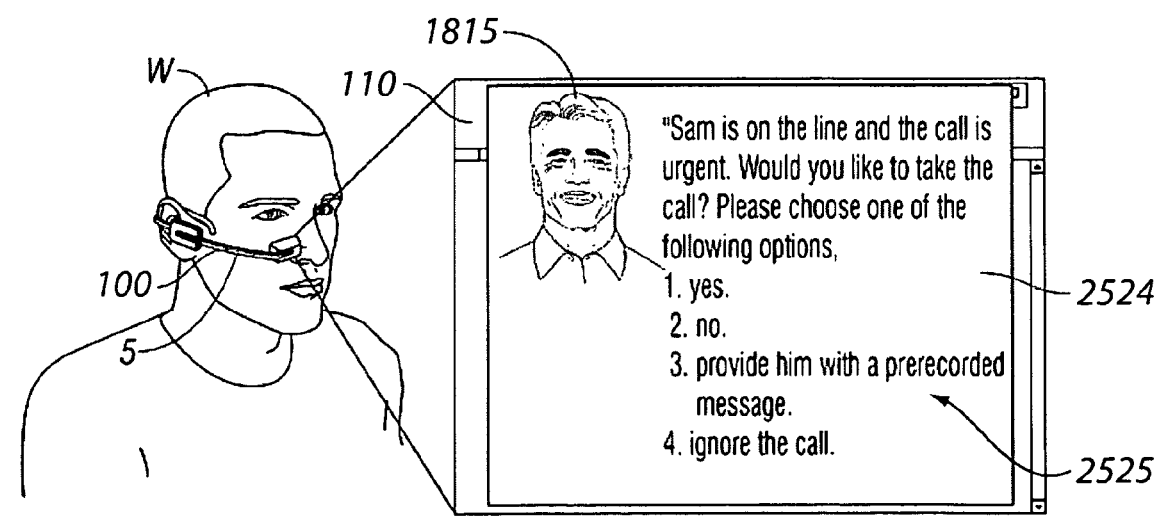

Turning now to FIG. 25, if urgent, the avatar 1815 will prompt the wearer W, "Do you want to take this call, it is urgent?" A number of options 2525 may be presented to the wearer W to determine how the wearer W wants to handle the incoming call. These options may include indications that the wearer W desires to (1) answer the call; (2) not answer the call; (3) provide a prerecorded message to the caller; and (4) ignore the call.

Figure 26:
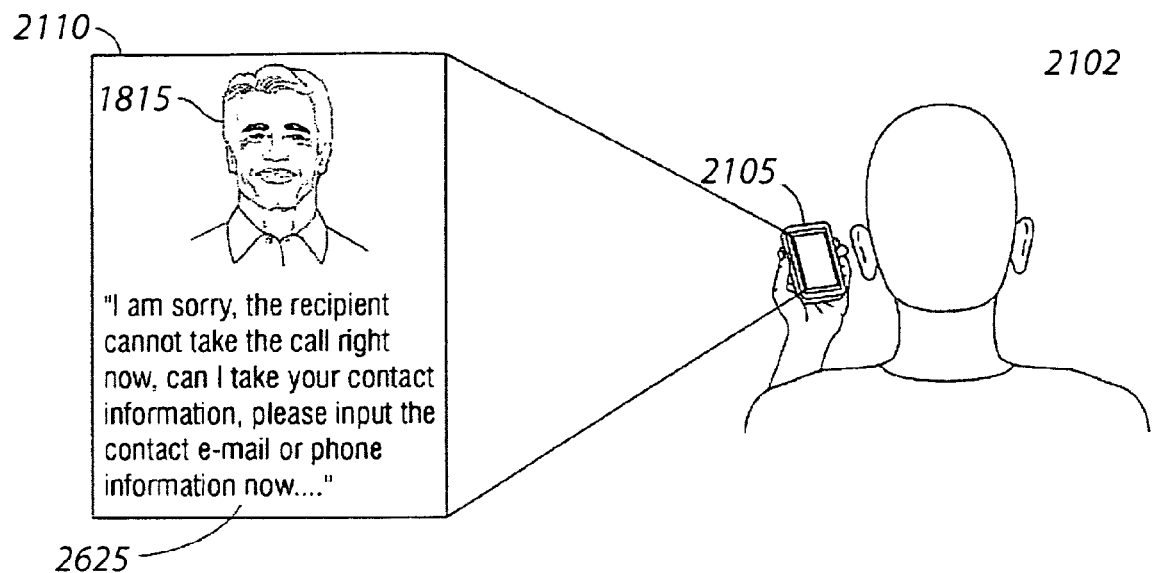

Turning to FIG. 26, if the wearer W does not want to take the call, the wearer W may input a speech command to the avatar 1815, and the avatar 1815 may then take the caller's contact information with speech recognition by saying "Please speak your number now, because the recipient is unreachable." Preferably, the avatar 1815 can also include speech recognition capabilities where the audio/visual head mounted wireless communication device 1000 can receive phone number information about the caller's device using speech recognition information and provide data about the caller to the wearer W.

During the wait time, again, the avatar 1815 may play a second pleasing audio or video file for the benefit of the caller, which is amusing or fun. In yet another embodiment, the avatar 1815 can be swapped for certain callers or for different stages of the holding process. The avatar 1815 can also provide interaction, data, programs, games, or other similar computer programs during the waiting period shown in FIG. 23.

Figure 27:
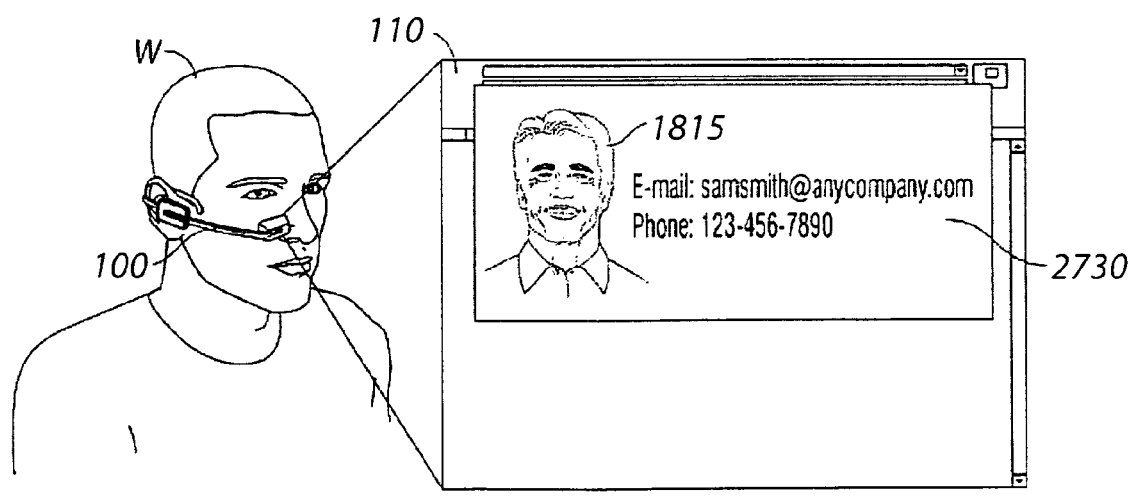

As shown in FIG. 27, the caller's 2102 contact information 2730 is displayed on the video display 10, and the wearer W may call the caller later using the device 100. Various other avatar 18 15 assistant configurations are possible and within the scope of the present disclosure, and the previously mentioned configuration is illustrative of one embodiment.

While this invention has been particularly shown and described with references to example embodiments thereof, it will be understood by those skilled in the art that various changes in form and details may be made therein without departing from the scope of the invention encompassed by the appended claims.

What is claimed is:

1. A head-wearable monocular display device comprising:
   a memory;
   a portable, miniature display configured to display multimedia content, wherein the multimedia content comprises an output audio signal and a corresponding video signal, the output audio signal being synchronized with the corresponding video signal;
   a speaker responsive to the output audio signal;
   a microphone configured to receive an audio signal including speech;
   a converter coupled to the microphone and configured to convert the received audio signal to a first digital representation of the audio signal, the first digital representation of the audio signal including language translation of the speech into a first language; and
   a controller configured to:
   (a) perform speech recognition of the first digital representation of the audio signal including recognizing the speech as translated into the first language;
   (b) compare the first digital representation of the audio signal to a lookup table stored in the memory;
   (c) convert the first digital representation of the audio signal to a control output based on the comparison, such that the control output is a function of the first language; and (d) output the control output to components of the device and enable interaction between the device and at least one external host computing device; and a wireless interface configured: (i) to interrogate and establish a wireless connection between the device and the at least one host computing device, (ii) to initiate a request for multimedia content by transmitting the control output in the form of a request to the at least one host computing device for multimedia content made available at a host display interface, wherein the control output is a function of the first language, and (iii) to receive multimedia content from the at least one host computing device in response to the request for multimedia content, wherein the head-wearable monocular display device is non-occlusive, and wherein the received multimedia content contains a second digital representation of the audio signal including a language translation of the speech included in the audio signal, the language translation translating the speech into a second language, the controller further configured to convert the second digital representation of the audio signal to a voice modulated audio signal including speech in the second language, the display and the speaker being responsive to the controller and rendering text representing a second digital representation of the audio signal synchronized with the voice modulated audio signal including speech in a second language.

2. The apparatus of claim 1 wherein the voice modulated audio signal is associated with a prerecorded voice stored in the memory.

3. The apparatus of claim 2 wherein the prerecorded voice stored in the memory is associated with a celebrity's voice.

4. The apparatus of claim 1 wherein the controller and the at least one host computing device are further configured to perform the translation substantially immediately after the microphone receives the audio signal to provide a substantially real-time language translation.

5. The apparatus of claim 1 wherein the control output is further a control command enabling control of the at least one host computing device, and the controller further configured to provide control instructions to the display, the microphone, and the speaker in a format for interacting in a visual and audio manner in response to the control commands, the format being associated with an avatar.

6. The apparatus of claim 5 wherein the avatar is configured to provide simulated human attributes to the apparatus including visual graphical elements displayed on the display.

7. The apparatus of claim 6 wherein the avatar further includes audio elements played on the speaker.

8. The apparatus of claim 7 wherein the audio elements includes a recorded human voice.

9. The apparatus of claim 8 wherein the recorded voice is a celebrity voice.

10. The apparatus of claim 6 wherein the avatar includes multimedia content.

11. The apparatus of claim 5 wherein the avatar is further configured to recognize speech and respond to at least one of a user's speech, speech included in an incoming phone call to the host device, or another device.

12. The apparatus of claim 5 wherein the avatar is further configured to display a menu of user-selectable choices.

13. The apparatus of claim 5 wherein the wireless interface is further configured to communicate with at least one remote device to receive a software application including at least one different avatar.

14. The apparatus of claim 13 wherein the at least one different avatar is received in exchange for a fee.

15. The apparatus of claim 5 wherein the avatar includes visual and audible elements that are associated with a known recognizable celebrity specifically chosen by a wearer.

16. The apparatus of claim 5 wherein the wireless interface is further configured to remotely access program instructions for interacting with at least one of a wearer, a remote device associated with the wearer, or a remote device not associated with the wearer.

17. The apparatus of claim 16 wherein the program instructions include instructions for providing speech commands to the wearer or a remote device associated with an individual or entity other than the wearer.

18. A method of interacting a head-wearable monocular display device and at least one host computing device, the method comprising:

interrogating and establishing a wireless connection between a wireless interface at the display device and at the least one host computing device;

transmitting a control output in the form of a request to the at least one host computing device for multimedia content made available at a host display interface, wherein the control output is a function of a first language;

receiving multimedia content from the at least one host computing device in response to the request for multimedia content, wherein the received multimedia content comprises an output audio signal and a corresponding video signal, the output audio signal being synchronized with the corresponding video signal;

receiving at the display device an audio signal including speech;

converting the received audio signal to a first digital representation of the audio signal, the first digital representation of the audio signal including language translation of the speech into a first language;

performing speech recognition of the first digital representation of the audio signal including recognizing the speech as translated into the first language;

comparing the first digital representation of the audio signal to a lookup table stored in a memory;

converting the first digital representation of the audio signal to a control output based on the comparison, such that the control output is a function of the first language;

outputting the control output as the request for multimedia content, and enabling interaction between the display device and the at least one host computing device, and in response to receiving the multimedia content from the at least one host computing device, display the received multimedia content on a display of the display device, wherein the head-wearable monocular display device is non-occlusive, and wherein the received multimedia content contains a second digital representation of the audio signal including a language translation of speech included in the audio signal into a second language;

converting the second digital representation of the audio signal to a voice modulated audio signal including speech in the second language; and playing the voice modulated audio signal including speech in the second language at a speaker of the monocular display device while displaying text representing a second digital representation of the audio signal synchronized with the voice modulated audio signal including speech in a second language.

19. The method of claim 18 wherein the voice modulated audio signal is associated with a prerecorded voice stored in the memory.

20. The method of claim 19 wherein the prerecorded voice stored in the memory is associated with a celebrity's voice.

21. The method of claim 18 further comprising performing the translation substantially immediately after receiving the audio signal, thereby providing a substantially real-time language translation.

22. The method of claim 18 wherein the control output is further a control command enabling control of at least one of the components of the apparatus, the at least one host computing device, and external devices, the method further comprising interacting in a visual and audio manner in response to the received speech commands in a format being associated with an avatar.

23. The method of claim 22 wherein interacting in a visual and audio manner in response to the received speech commands in the format being associated with the avatar further includes providing simulated human attributes to the apparatus including visual graphical elements displayed on the display.

24. The method of claim 23 wherein interacting in a visual and audio manner in response to the received speech commands in the format being associated with the avatar further includes playing audio elements on a speaker.

25. The method of claim 24 wherein the audio elements includes a recorded human voice.

26. The method of claim 25 wherein the recorded voice is a celebrity voice.

27. The method of claim 23 wherein the avatar includes further multimedia content.

28. The method of claim 22 wherein interacting in a visual and audio manner in response to the received speech commands in the format being associated with the further includes recognizing speech and responding to at least one of a user's speech, speech included in an incoming phone call to the host device, or another device.

29. The method of claim 22 wherein interacting in a visual and audio manner in response to the received speech commands in the format being associated with the avatar further includes displaying a menu of user-selectable choices.

30. The method of claim 22 further comprising communicating with at least one remote device to receive a software application including at least one different avatar.

31. The method of claim 30 further comprising paying a fee in exchange for the at least one different avatar.

32. The method of claim 22 further comprising choosing visual and audible elements for the avatar that are associated with a known recognizable celebrity.

33. The method of claim 22 further comprising remotely accessing program instructions for interacting with at least one of a wearer, a remote device associated with the wearer, or a remote device not associated with the wearer.

34. The method of claim 33 wherein the program instructions include instructions for providing speech commands to the wearer or a remote device associated with an individual or entity other than the wearer.

35. A system for providing multimedia content to a user, the system comprising:
  at least one host computing device, including a host display interface and a first wireless interface configured to respond to an interrogation and establish a wireless connection between the at least one host computing device and an external device, the at least one host computing device configured to provide to the external device multimedia content made available at the host display interface of the at least one host computing device, and the first wireless interface further configured to receive a request for multimedia content from the external device and transmit multimedia content to the external device in response to the request for multimedia content, wherein the transmitted multimedia content comprises an output audio signal and a corresponding video signal, the output audio signal being synchronized with the corresponding video signal; and
  a non-occlusive head-wearable monocular display device including: (1) a portable, miniature display configured to display multimedia content, (2) a second wireless interface configured to establish a wireless connection between the head-wearable monocular display device and at the least one host computing device, the second wireless interface further configured to: (i) interrogate and establish a wireless connection with the at least one host computing device, (ii) transmit the request to the at least one host computing device for multimedia content made available at the host display interface of the at least one host computing device, wherein a control output is a function of the first language, and (iii) receive multimedia content from the at least one host computing device transmitted in response to the request for multimedia content, (3) a speaker responsive to the output audio signal, (4) a microphone configured to receive an audio signal including speech, (5) a converter coupled to the microphone and configured to convert the received audio signal to a first digital representation of the audio signal, and the first digital representation of the audio signal including language translation of the speech into a first language, and (6) a controller configured to:
    (a) perform speech recognition including recognizing the speech as translated into the first language;
    (b) compare the first digital representation of the audio signal to a lookup table stored in the memory;
    (c) convert the first digital representation of the audio signal to a control output based on the comparison, such that the control output is a function of the first language; and
    (d) output the control output to components of the apparatus to enable interaction with at least one of the head-wearable monocular display device, the at least one host computing device, and external devices, wherein the received multimedia content contains the second digital representation of the received audio signal including a language translation of speech included in said audio signal into the second language, the controller further configured to convert the second digital representation of the audio signal to a voice modulated audio signal including speech in the second language, the miniature display and the speaker being responsive to the controller and rendering text representing a second digital representation of the audio signal synchronized with the voice modulated audio signal including speech in a second language.

36. A computer readable medium containing computer readable instructions that, when executed by a computer, cause the computer to:
  establish a wireless connection with at least one host computing device;
  transmit a control output in the form of a request to the at least one host computing device for multimedia content made available at a host display interface, wherein the multimedia content comprises an output audio signal and a corresponding video signal, the output audio signal being synchronized with the corresponding vide signal;
  convert a received audio signal including speech to a first digital representation of the audio signal, the first digital representation of the audio signal including language translation of the speech into a first language;

compare the first digital representation of the audio signal to a lookup table stored in a memory;

convert the first digital representation of the audio signal to a control output based on the comparison, such that the control output is a function of the first language;

output the control output and enable interaction with at least one of the computer, at least one host computing device, and external devices, the interaction including receiving multimedia content from the at least one host computing device, and wherein the received multimedia content contains a second digital representation of the received audio signal including a language translation of the speech included in the audio signal into a second language;

convert the second digital representation of the audio signal to a voice modulated audio signal including speech in the second language; and render the voice modulated audio signal including speech in the second language at a speaker while rendering at a display monitor text representing a second digital representation of the audio signal synchronized with the voice modulated audio signal including speech in a second language.

* * * * *

UNITED STATES PATENT AND TRADEMARK OFFICE
CERTIFICATE OF CORRECTION

PATENT NO. : 8,825,468 B2
APPLICATION NO. : 12/221199
DATED : September 2, 2014
INVENTOR(S) : Jeffrey J. Jacobsen and Stephen A. Pombo Page 1 of 1

It is certified that error appears in the above-identified patent and that said Letters Patent is hereby corrected as shown below:

IN THE CLAIMS:

In column 36, line 64, after "corresponding" delete "vide" and insert --video--.

Signed and Sealed this
Sixteenth Day of December, 2014

Michelle K. Lee
*Deputy Director of the United States Patent and Trademark Office*